US012630314B1

(12) United States Patent
Wise et al.

(10) Patent No.: US 12,630,314 B1
(45) Date of Patent: May 19, 2026

(54) APPARATUSES, SYSTEMS, AND METHODS FOR MODULAR CONFIGURABLE AUTONOMOUS FLUID INTERFACE

(71) Applicant: SpaceWorks Enterprises, Inc., Atlanta, GA (US)

(72) Inventors: Evan Shelby Wise, Avondale Estates, GA (US); Kevin Josue Okseniuk, Lawrenceville, GA (US); Ryan Isaac Druss, Lawrenceville, GA (US); Alexander William Ribner, Atlanta, GA (US); Reagan Christopher Mayo, Atlanta, GA (US)

(73) Assignee: SpaceWorks Enterprises, Inc., Atlanta, GA (US)

( * ) Notice: Subject to any disclaimer, the term of this patent is extended or adjusted under 35 U.S.C. 154(b) by 0 days.

(21) Appl. No.: 19/064,245

(22) Filed: Feb. 26, 2025

Related U.S. Application Data

(60) Provisional application No. 63/639,224, filed on Apr. 26, 2024.

(51) Int. Cl.
B64G 1/64 (2006.01)
B67D 7/04 (2010.01)

(52) U.S. Cl.
CPC ............ B64G 1/646 (2013.01); B67D 7/0401 (2013.01)

(58) Field of Classification Search
CPC ...... B64G 1/646; B64G 1/402; B64G 1/4024; B64G 1/413; B67D 7/04; B67D 7/0401; B67D 7/0294; B67D 7/36
USPC ...................................................... 141/311 R
See application file for complete search history.

(56) References Cited

U.S. PATENT DOCUMENTS

| | | | | |
|---|---|---|---|---|
| 5,634,503 | A * | 6/1997 | Musil ..................... | B67D 7/145 |
| | | | | 901/41 |
| 7,082,969 | B1 * | 8/2006 | Hollerback ............ | B67D 7/065 |
| | | | | 141/38 |
| 8,074,935 | B2 * | 12/2011 | Gryniewski ............. | B64G 5/00 |
| | | | | 244/172.4 |
| 8,820,353 | B2 * | 9/2014 | Yandle ................. | B64G 1/4022 |
| | | | | 137/614.04 |
| 9,260,206 | B2 * | 2/2016 | Allen ........................ | B64G 1/64 |
| 9,725,295 | B2 * | 8/2017 | McKay .................. | B67D 7/362 |
| 11,066,180 | B2 * | 7/2021 | Mills ....................... | G01R 29/12 |
| 11,084,710 | B1 * | 8/2021 | Raven .................. | B64G 1/1078 |
| 11,128,082 | B1 * | 9/2021 | Wise ........................ | B64G 1/64 |

(Continued)

*Primary Examiner* — Kenneth Rinehart
*Assistant Examiner* — Stephanie A Shrieves
(74) *Attorney, Agent, or Firm* — Bradley Arant Boult Cummings LLP; Daniel E. Sineway, Esq.

(57) ABSTRACT

A fluid interface is disclosed including a fluid controller mounted onto a host structure. The fluid controller includes a manifold with a fluid outlet port and a fluid inlet port. The fluid controller includes fluid sensors operatively configured to measure flow characteristics of one or more fluids transferred between the fluid inlet port and the fluid outlet port, wherein the fluid inlet port is coupled to at least one fluid source. The fluid interface includes a fluid connector mounted onto the host structure. The fluid connector includes an actuator mounted onto the exterior side of the host structure, a valve coupled to an actuator rod of the actuator, and an elastically deforming tubing comprising a first end and a second end, wherein the first end is operatively connected to the valve and the second end is operatively connected to the fluid outlet port.

13 Claims, 13 Drawing Sheets

(56) References Cited

U.S. PATENT DOCUMENTS

| | | | | |
|---|---|---|---|---|
| 12,030,674 | B2 * | 7/2024 | Licciardello ......... | B64G 1/4024 |
| 12,187,466 | B2 * | 1/2025 | Bultitude ............. | B64G 1/6462 |
| 12,195,204 | B2 * | 1/2025 | Deuitch ............... | B64G 1/4024 |

* cited by examiner

400

404B

404A

402A

410A

402B

410B

APPARATUSES, SYSTEMS, AND METHODS FOR MODULAR CONFIGURABLE AUTONOMOUS FLUID INTERFACE

CROSS REFERENCE TO RELATED APPLICATIONS

This application claims the benefit of and priority to U.S. Provisional Patent Application No. 63/639,224, filed Apr. 26, 2024, and entitled "APPARATUSES, SYSTEMS, AND METHODS FOR MODULAR CONFIGURABLE AUTONOMOUS FLUID INTERFACE," which is incorporated herein by reference in its entirety.

GOVERNMENT SUPPORT CLAUSE

This invention was made with government support under contract number FA9453-23-P-A003 awarded by the Department of the Air Force. The government has certain rights in the invention.

TECHNICAL FIELD

The present apparatuses, systems, and methods relate generally to mechanisms and interfaces that enable functional connection between fluid storage systems, and more particular to connections that enable the transfer of fluids between these systems in an autonomous manner.

BACKGROUND

The proliferation of industrial systems and consequent growth of a commodity-based distributed economy requires the transportation and exchange of goods between various systems. These systems are embodied, for example, in ships that transport liquids across bodies of water, ground vehicles that transport gases on terrestrial roads, and space vehicles that contain and transport these goods across space. Typically, vehicles are donors or recipients of goods, sometimes simultaneously. The transferred goods can be intangible, such as data transmitted over a wireless radio frequency link, or tangible such as electrical current, solid goods, or fluids. Common fluids utilized by spacecrafts may include pressurant like helium (He) and nitrogen (N2); propellants like hydrogen (H2), hydrazine (N2H4), hydrogen peroxide (H2O2), oxygen (O2), dinitrogen tetroxide (N2O4), and Xenon (Xe); and other utility fluids that could be purposed for multiple mission needs like water (H2O) and air. Some systems may also utilize cryogenic fluids, such as liquid hydrogen (LH2), liquid oxygen (LOX), liquid nitrogen (LN2), liquid helium (LHe), or hydrocarbons such as those present in liquified natural gas (LNG).

Tangible goods typically require a structural connection between hardware through a specialized interface that is optimized for the transfer of a specific good. In general, designs that maximize performance metrics (such as mechanical strength, environmental robustness, flow rate, etc.) while minimizing cost metrics (including size, weight, power, spilled fluid mass, and financial cost) are desired over those that increase such metrics. Existing systems do not provide an adequate solution for multi-good transfer, including fluid transfer, in platforms that represent low size, weight, power, or financial cost.

Therefore, there is a long-felt but unresolved need for apparatuses, systems, and methods for modular configurable autonomous fluid interfaces.

BRIEF SUMMARY OF THE DISCLOSURE

Briefly described, and according to one embodiment, aspects of the present disclosure generally relate to systems, methods, and apparatuses for mechanisms and interfaces that enable functional connection between fluid storage systems. The system can include a fluid interface, which may include one or more valves and one or more actuators to extend or connect them. The fluid interface can leverage the alignment or load-bearing capacity of host structures across two or more vehicles. The host structure can be the external housing of a modular connector (e.g., SpaceWorks FuseBlox™ unit) or any structure that provides appropriate alignment or load-bearing performance. An example application of the disclosure includes two spacecrafts docking together to transfer fluids from a first spacecraft to a second spacecraft. The modular connector can provide a mechanism that can enable the connection and docking between two modular devices and enable the transfer of fluids between the devices in an autonomous manner. The modular devices can correspond to spacecrafts, robotic systems, or satellites.

Moreover, aspects of the present disclosure generally relate to systems, methods, and apparatuses for mechanisms and interfaces that enable functional connection between fluid storage systems, and more particularly to connections that enable the transfer of fluids between these systems in an autonomous manner. In various embodiments, the disclosed system provides a mechanism that allows for the automated and autonomous transfer of fluids between two modular devices. In at least one example, the present disclosure describes a fluid transport interface, or simply a "fluid interface," operatively connected to the modular devices (also referred to throughout the present disclosure as "host structures").

The modular devices can correspond to spacecrafts, satellites, or portions thereof. In one embodiment, the present technology enables a modular fluid transfer system that accelerates the utilization and commercialization of modular systems, including but not limited to, spacecrafts, robotic devices, low earth orbit satellites, satellites orbiting a celestial body, and geostationary (or geosynchronous) satellites of various shapes and sizes. In these embodiments, a fluid interface can establish a secure fluid transfer connection that integrates with the modular devices, supporting the transfer of various fluids, such as pressurants, propellants, and utility fluids, between two or more modular devices. A fluid interface, in one or more embodiments, provides a design that is modular, flexible, and capable of maintaining a sealed connection under varying operational conditions. Additionally, a fluid interface allows for multiple fluid transfer orientations and can provide a mechanism for verification and monitoring prior to, during, or after the transfer.

In particular embodiments, the disclosed fluid interfaces are compact in both size and weight, designed to fit within the constraints of modular systems. In one or more embodiments, a fluid interface may include a variety of components, including but not limited to fluid manifolds, actuators, valves (such as quick release valves), mechanical linkages, and interconnect components (tubes). In one example, the fluid manifold can serve as the central hub for fluid distribution, housing components such as relief valves, pressure transducers, etc. The relief valve can release excess fluid to prevent overpressure events. In one example, the pressure transducer can continuously monitor the pressure within the manifold. One or more solenoid valves can control the flow of fluids. In various embodiments, one or more interconnect components, also referred to herein as tubes, provide a flexible and sealed connection between the fluid manifold and the fluid interface. The interconnect component can include bellows, coiled hard lines, serpentine hard lines, flex hoses, or telescopic sealed tubes, ensuring reliable fluid transfer in dynamic environments.

In one or more embodiments, a fluid interface may mate or pair with another fluid interface. In these embodiments, the fluid interfaces determine the appropriate connection configuration based on the operational requirements. This on-the-fly determination of connection roles, in combination with the fluid interface's modular design, multiple transfer orientations, and secure sealing capability, establishes a notable improvement over previous technology, which was more limited and less efficient.

Alternative embodiments of fluid interfaces may include features that are, in some respects, similar to the various components described above. For example, such alternative embodiments may include, but are not limited to larger dimensions, different interconnect components, various fluid control mechanisms, and other like variations.

According to particular embodiments, the present disclosure generally describes a fluid interface including: a fluid manifold with integrated pressure transducer and relief valve; a solenoid valve for controlling fluid flow; an interconnect component providing a flexible and sealed connection; and sensors for monitoring pressure and temperature. The fluid interface is designed to operate in various environments, including but not limited to, in planetary or celestial orbits and atmospheres, on or under various surfaces, etc.

In particular embodiments, the present disclosure describes the fluid interface herein, further including a main control unit for operational control of the fluid interface. In one or more embodiments, aspects of the present disclosure generally describe the fluid interface herein, wherein the interconnect component is configured to connect to a fluid interface in a plurality of orientations. In some embodiments, the present disclosure describes the fluid interface herein, further including one or more electronic interface boards for transferring and receiving data, the one or more electronic interface boards including sensors. In one example, the sensors can be proximity sensors, or similar sensors that are configured to determine an orientation, distance, or status of a mating interface. Generally, in at least one embodiment, the present disclosure describes the fluid interface herein, further including one or more interfaces including at least one of: a load-bearing mechanical interface, a power transfer interface, a fluid transfer interface, a mechanical transfer interface, and a data transfer interface. In particular embodiments, the present disclosure describes the fluid interface herein, wherein fluid interface is designed to operate in various environments, including but not limited to, in planetary or celestial orbits and atmospheres, on or under various surfaces, etc.

In particular embodiments, the present disclosure describes the method herein, further including prior to establishing a fluid connection via the one or more interfaces, exchanging, via a wireless connection, data between the first fluid interface and the second fluid interface. In various embodiments, the present disclosure describes the method herein, further including performing, via the first fluid interface and the second fluid interface, an automated rendezvous routine to cause the first fluid interface and the second fluid interface to be proximate to one another. In some embodiments, the present disclosure describes the method herein, further including extending, via the actuator housed of the first fluid interface, the interconnect component and valve of the first fluid interface to disengage from the second fluid interface; and retracting the interconnect component and valve from the second fluid interface.

According to a first aspect, or any other aspect discussed herein, the present disclosure discusses a fluid transport interface, including: a fluid controller mounted onto a host structure, the fluid controller including a manifold, the manifold including a fluid outlet port and a fluid inlet port, and wherein the fluid controller further includes one or more fluid sensors operatively configured to measure flow characteristics of one or more fluids transferred between the fluid inlet port and the fluid outlet port, wherein the fluid inlet port is coupled to at least one fluid source; and a fluid connector mounted onto the host structure, the fluid connector including an actuator mounted onto the host structure, a valve coupled to an actuator rod of the actuator, and a tubing including a first end and a second end, wherein the first end is operatively connected to the valve and the second end is operatively connected to the fluid outlet port.

According to a second aspect, or any other aspect discussed herein, the fluid transport interface includes a computing device housed within the host structure, wherein the computing device is operatively configured to detect a docking between the host structure and a target host structure.

According to a third aspect, or any other aspect discussed herein, in response to detecting the docking between the host structure and the target host structure, the computing device is further operatively configured to initiate an autonomous transfer of a fluid between the fluid transport interface and a target fluid transport interface at the target host structure.

According to a fourth aspect, or any other aspect discussed herein, the fluid transport interface is operatively configured to connect the valve to a target valve at a target fluid transport interface in response to the host structure docking to a target host structure.

According to a fifth aspect, or any other aspect discussed herein, the fluid controller further includes a solenoid valve operatively configured to control fluid flow from the at least one fluid source through the fluid inlet port.

According to a sixth aspect, or any other aspect discussed herein, the tubing is manufactured from a ductile metal, and wherein the tubing is temporarily elongated in response to the fluid transport interface connecting the valve to the target valve.

According to a seventh aspect, or any other aspect discussed herein, the one or more fluid sensors include a fluid pressure transducer, a temperature sensor, and/or a flowmeter.

According to an eighth aspect, or any other aspect discussed herein, the manifold further includes a pressure relief valve operatively configured to relieve a fluid pressure within the manifold in response to the fluid pressure exceeding a predetermined threshold.

According to a nineth aspect, the present disclosure discusses a system including: a target valve at a target host structure; and a fluid transport interface at a source host structure, wherein the fluid transport interface includes: a fluid controller mounted onto a source host structure, the fluid controller including a manifold, the manifold including a fluid outlet port and a fluid inlet port, wherein the fluid controller further includes one or more fluid sensors operatively configured to measure flow characteristics of one or more fluids transferred between the fluid inlet port and the fluid outlet port, and wherein the fluid inlet port is coupled to at least one fluid source; a plurality of fluid connectors, wherein each fluid connector of the plurality of fluid connectors is mounted onto the source host structure, wherein each fluid connector of the plurality of fluid connectors includes an actuator, a valve coupled to an actuator rod of the actuator, and a tubing including a first end and a second end, wherein the first end is operatively connected to the valve and the second end is operatively connected to the fluid outlet port; and a computing device housed within the source host structure, wherein the computing device is operatively configured to: detect a docking between the source host structure and the target host structure; determine a docking orientation between the source host structure and the target host structure; based on the docking orientation, initiate movement of a particular valve towards the target valve, wherein the particular valve corresponds to a particular fluid connector of the plurality of fluid connectors, and wherein initiating movement of the particular valve includes moving a particular actuator rod via activating the actuator; connect the particular valve to the target valve with a predetermined force, via continued activation of the actuator, wherein the predetermined force is based on a maximum expected operating pressure; and initiate a transfer of a fluid from the at least one fluid source to the target valve through the particular fluid connector.

According to a tenth aspect, or any other aspect discussed herein, the fluid controller further includes a solenoid valve operatively configured to control fluid flow from the at least one fluid source through the fluid inlet port.

According to an eleventh aspect, or any other aspect discussed herein, the tubing is manufactured from a ductile metal, and wherein the tubing is temporarily elongated in response to the fluid transport interface connecting the valve to the target valve.

According to a twelfth aspect, or any other aspect discussed herein, the one or more fluid sensors include a fluid pressure transducer, a temperature sensor, and/or a flowmeter.

According to a thirteenth aspect, or any other aspect discussed herein, the manifold further includes a pressure relief valve operatively configured to relieve a fluid pressure within the manifold in response to the fluid pressure exceeding a predetermined threshold.

According to a fourteenth aspect, the present disclosure discusses a method including: detecting, via a computing device at a source host structure, a docking between the source host structure and a target host structure; initiating movement of a valve towards a target valve, wherein the valve corresponds to a particular fluid connector of a plurality of fluid connectors mounted onto the source host structure, the particular fluid connector including an actuator, the valve coupled to an actuator rod of the actuator, and a tubing including a first end and a second end, wherein the first end is operatively connected to the valve and the second end is operatively connected to at least one fluid source, and wherein initiating movement of the valve includes moving the actuator rod via activating the actuator; connecting the valve to the target valve with a predetermined force, via continued activation of the actuator, wherein the predetermined force is based on a maximum expected operating pressure; and initiating a transfer of a fluid from the at least one fluid source to the target valve through the particular fluid connector.

According to a fifteenth aspect, or any other aspect discussed herein, the particular fluid connector of the plurality of fluid connectors is determined based on a docking orientation between the source host structure and the target host structure.

According to a sixteenth aspect, or any other aspect discussed herein, the tubing is manufactured from a ductile metal, and wherein the tubing is temporarily elongated in response to connecting the valve to the target valve.

According to a seventeenth aspect, or any other aspect discussed herein, the method further including detecting an indication of a completed transfer of the fluid via one or more fluid sensors, the one or more fluid sensors including a fluid pressure transducer, a temperature sensor, and/or a flowmeter.

According to an eighteenth aspect, or any other aspect discussed herein, the method further including disconnecting the valve from the target valve, wherein disconnecting includes the tubing retracting from its temporarily elongated state.

According to a nineteenth aspect, or any other aspect discussed herein, the tubing includes a plurality of bellows for enabling the temporary elongation.

According to a twentieth aspect, or any other aspect discussed herein, the tubing includes a coiled or planar spring shape.

These and other aspects, features, and benefits of the claimed system will become apparent from the following detailed written description of the preferred embodiments and aspects taken in conjunction with the following drawings, although variations and modifications thereto may be affected without departing from the spirit and scope of the concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
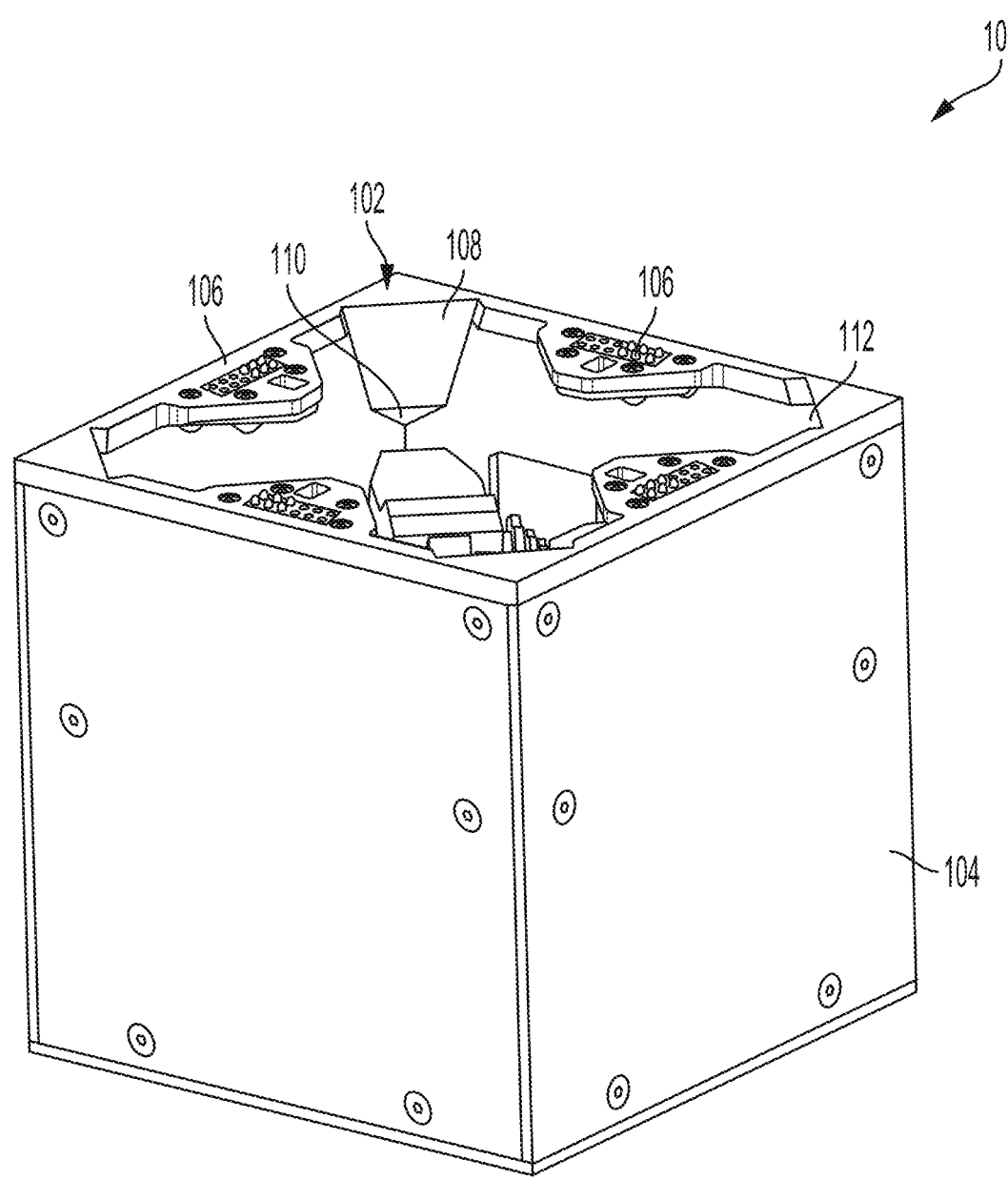
FIG. 1A illustrates an exemplary modular connector according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

The above and further features of the disclosed exemplary modular connectors will be recognized from the following detailed descriptions and drawings of particular embodiments.

Overview

According to various aspects of the present disclosure, aspects of the present disclosure generally relate to systems, methods, and apparatuses for mechanisms and interfaces that enable functional connection between fluid storage systems. The system can include a fluid interface, which may include one or more valves and one or more actuators to extend or connect them. The fluid interface can leverage the alignment or load-bearing capacity of host structures across two or more vehicles. The host structure can be the external housing of a modular connector (e.g., SpaceWorks FuseBlox™ unit) or any structure that provides appropriate alignment or load-bearing performance. An example application of the disclosure includes two spacecrafts docking together to transfer fluids from a first spacecraft to a second spacecraft. The modular connector can provide a mechanism that can enable the connection and docking between two modular devices and enable the transfer of fluids between the devices in an autonomous manner. The modular devices can correspond to spacecrafts, robotic systems, or satellites.

Moreover, aspects of the present disclosure generally relate to systems, methods, and apparatuses for mechanisms and interfaces that enable functional connection between fluid storage systems, and more particularly to connections that enable the transfer of fluids between these systems in an autonomous manner. In various embodiments, the disclosed system provides a mechanism that allows for the automated and autonomous transfer of fluids between two modular devices. In at least one example, the present disclosure describes a fluid transport interface, or simply a "fluid interface," operatively connected to the modular devices (also referred to throughout the present disclosure as "host structures").

The modular devices can correspond to spacecrafts, satellites, or portions thereof. In one embodiment, the present technology enables a modular fluid transfer system that accelerates the utilization and commercialization of modular systems, including but not limited to, spacecrafts, robotic devices, low earth orbit satellites, satellites orbiting a celestial body, and geostationary (or geosynchronous) satellites of various shapes and sizes. In these embodiments, a fluid interface can establish a secure fluid transfer connection that integrates with the modular devices, supporting the transfer of various fluids, such as pressurants, propellants, and utility fluids, between two or more modular devices. A fluid interface, in one or more embodiments, provides a design that is modular, flexible, and capable of maintaining a sealed connection under varying operational conditions. Additionally, a fluid interface allows for multiple fluid transfer orientations and can provide a mechanism for verification and monitoring prior to, during, or after the transfer.

In particular embodiments, the disclosed fluid interfaces are compact in both size and weight, designed to fit within the constraints of modular systems. In one or more embodiments, a fluid interface may include a variety of components, including but not limited to fluid manifolds, actuators, valves (such as quick release valves), mechanical linkages, and interconnect components (tubes). In one example, the fluid manifold can serve as the central hub for fluid distribution, housing components such as relief valves, pressure transducers, etc. The relief valve can release excess fluid to prevent overpressure events. In one example, the pressure transducer can continuously monitor the pressure within the manifold. One or more solenoid valves can control the flow of fluids. In various embodiments, one or more interconnect components, also referred to herein as tubes, provide a flexible and sealed connection between the fluid manifold and the fluid interface. The interconnect component can include bellows, coiled hard lines, serpentine hard lines, flex hoses, or telescopic sealed tubes, ensuring reliable fluid transfer in dynamic environments.

In one or more embodiments, a fluid interface may mate or pair with another fluid interface. In these embodiments, the fluid interfaces determine the appropriate connection configuration based on the operational requirements. This on-the-fly determination of connection roles, in combination with the fluid interface's modular design, multiple transfer orientations, and secure sealing capability, establishes a notable improvement over previous technology, which was more limited and less efficient.

Alternative embodiments of fluid interfaces may include features that are, in some respects, similar to the various components described above. For example, such alternative embodiments may include, but are not limited to larger dimensions, different interconnect components, various fluid control mechanisms, and other like variations.

According to particular embodiments, the present disclosure generally describes a fluid interface including: a fluid manifold with integrated pressure transducer and relief valve; a solenoid valve for controlling fluid flow; an interconnect component providing a flexible and sealed connection; and sensors for monitoring pressure and temperature. The fluid interface is designed to operate in various environments, including but not limited to, in planetary or celestial orbits and atmospheres, on or under various surfaces, etc.

In particular embodiments, the present disclosure describes the fluid interface herein, further including a main control unit for operational control of the fluid interface. In one or more embodiments, aspects of the present disclosure generally describe the fluid interface herein, wherein the interconnect component is configured to connect to a fluid interface in a plurality of orientations. In some embodiments, the present disclosure describes the fluid interface herein, further including one or more electronic interface boards for transferring and receiving data, the one or more electronic interface boards including sensors. In one example, the sensors can be proximity sensors, or similar sensors that are configured to determine an orientation, distance, or status of a mating interface. Generally, in at least one embodiment, the present disclosure describes the fluid interface herein, further including one or more interfaces including at least one of: a load-bearing mechanical interface, a power transfer interface, a fluid transfer interface, a mechanical transfer interface, and a data transfer interface.

In particular embodiments, the present disclosure describes the fluid interface herein, wherein fluid interface is designed to operate in various environments, including but not limited to, in planetary or celestial orbits and atmospheres, on or under various surfaces, etc.

In particular embodiments, the present disclosure describes the method herein, further including prior to establishing a fluid connection via the one or more interfaces, exchanging, via a wireless connection, data between the first fluid interface and the second fluid interface. In various embodiments, the present disclosure describes the method herein, further including performing, via the first fluid interface and the second fluid interface, an automated rendezvous routine to cause the first fluid interface and the second fluid interface to be proximate to one another. In some embodiments, the present disclosure describes the method herein, further including extending, via the actuator housed of the first fluid interface, the interconnect component and valve of the first fluid interface to disengage from the second fluid interface; and retracting the interconnect component and valve from the second fluid interface.

EXAMPLE EMBODIMENTS

Figure 1B:
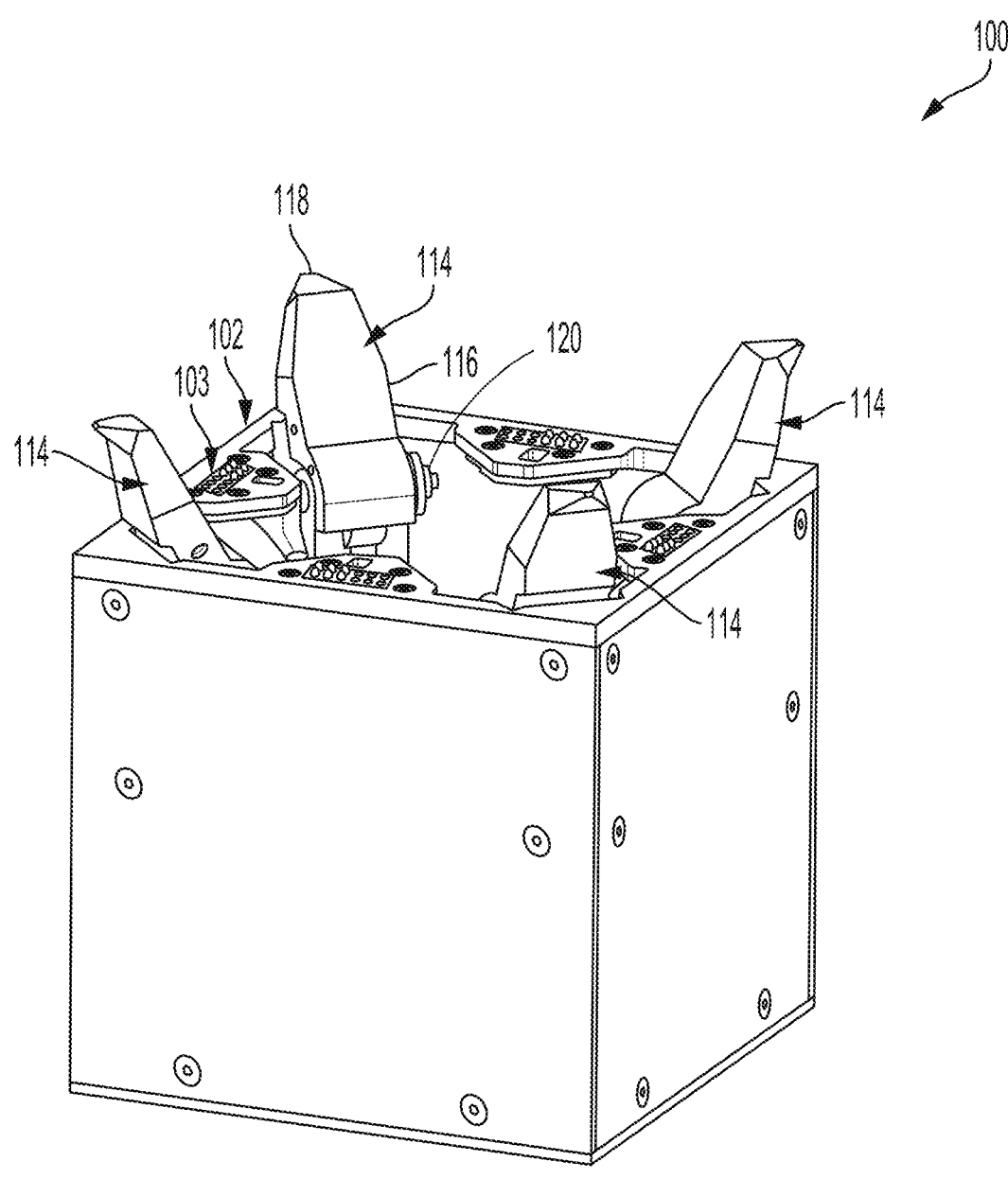
FIG. 1B illustrates an exemplary modular connector according to one embodiment of the present disclosure.

Turning now to FIGS. 1A and 1B, perspective views of an exemplary modular connector 100 are shown, according to one embodiment of the present disclosure. In particular embodiments, the exemplary modular connector 100 is configured to be positioned on or connected to a modular device, such as a satellite module or a robotic modular. Multiple modular connectors 100 can be respectively positioned on or connected to multiple modular devices. In some embodiments, two or more modular connectors 100 can be mounted to a single modular device, such that the modular device can couple to two or more other modular devices. In some embodiments, the modular devices can be used for integration with one or more satellite platforms. As used herein, a satellite module refers to a payload (e.g., electronic product, space probe, mechanical tool, etc.) placed into orbit, and a satellite platform refers to a collection of two or more satellite modules. Although some aspects of the present disclosure are discussed with reference to spacecraft or satellites, nothing in the disclosure limits such aspects to use with spacecraft or satellites. In some embodiments, the exemplary modular connector is a modular spacecraft connector, such that the modular connector provides mechanical, power, and data connection between satellite modules. In one or more embodiments, data may be transferred wirelessly (e.g., radio frequency, optical communications, etc.) and/or wired (e.g., Ethernet). In some embodiments, the data may be transferred wirelessly between two or more modular connector when a wired connection is not present or not working, and through the wired connect when the wired connection is present. In some embodiments, and as will be described in greater detail beginning with the discussion of FIG. 4A, a fluid interface can be provided to transfer fluids between the modular connectors. As an example, a liquid propellant can be transferred from one modular connectors to another. In some embodiments, the interfaces extend through to the modular device, such that power transfer, data transfer, fluid transfer, and mechanical transfer can occur between modular devices via the modular connectors, or between a modular device and a paired modular connector. The fluid interface can include a scaling mechanism to prevent leaking. As an example, when the fluid interface from two modular connectors come into contact, a clamping mechanism can compress the interface together to prevent leaking. In another example, the pulling force of the claw assembly 114 can provide a clamping force on the fluid interface to provide a seal.

For example, a satellite module containing one modular connector may establish a connection to a second satellite module containing a second modular connector. In this example, once connected, both satellite modules are now operative to share data and power such that the satellite modules collectively form a satellite platform. Continuing with this example, and as will be further discussed herein, to establish a connection, the modular connectors interlock their respective components and interface with each other. In various embodiments, the connection of multiple satellite modules via one or more modular connectors allows for an embedded redundancy. In these embodiments (and others), data and power may not be lost in the event of a failure by one or more system components.

According to various aspects of the present disclosure, and as shown in FIG. 1A, the exemplary modular connector 100 includes a face panel 102 affixed to four side panels 104. The face panel can include several interfaces 103 as described herein. In one or more embodiments, the face panel may be a generally four-sided figure, whereby the four sides define an opening. In at least one embodiment, the face panel 102 is generally square-shaped. In another embodiment, the face panel may be any suitable shape (e.g., triangular, hexagonal, circular, etc.). In some embodiments, a number of extendable arms can correspond to a number of sides in the shape of the face panel. In some embodiments, one or more corners of the face panel 102 include a substantially triangular tooth 108 extending below the surface of the face panel to provide support when the modular connector 100 is paired with another modular connector. In various embodiments, the substantially triangular tooth allows for a corner notch 112 in the opening defined by the face panel 102. In at least one embodiment, the tip 110 of the tooth 108 is angled inward towards the inner walls of the side panels 104 to further facilitate the pairing of modular connectors. In some embodiments, each of the four side panels 104 is substantially square-shaped. In particular embodiments, the side panels 104 and the face panel 102 connect to form a prismatic-shaped modular connector. In various embodiments, the modular connector may be any suitable shape.

In certain embodiments, one or more interfaces can be coupled to the face panel 102. The interfaces can include interface boards 106. In these embodiments (and others), the interface boards may extend from one or more sides of the face panel into the opening defined by the face panel 102. In one embodiment, the interface boards 106 are semi-octagonal in shape. In another embodiment, the interface boards 106 are semi-circular in shape. In various embodiments, the interface boards may be any suitable shape (e.g., triangular, rectangular, etc.). In at least one embodiment, the one or more interface boards 106 facilitate an electronic connection when the modular connector 100 is paired (e.g., connected) to another modular connector. In certain embodiments, the interface boards allow for the transfer of power and data between connected modular connectors. In one or more embodiments, data may be transferred wirelessly (e.g., radio frequency, optical communications, etc.) or wired (e.g., Ethernet). In particular embodiments, the interface boards help to regulate power in the modular connector 100. In one or more embodiments, the interface boards help to regulate power received by, and transferred to, a connected (e.g., paired) modular connector. In at least one embodiment, a modular connector 100 may draw extra power from a connected satellite platform. In some embodiments, the interface boards 106 may provide a gateway to one or more ground stations to facilitate communication. In various embodiments, the one or more interface boards 106 include proximity sensors to help detect the presence of nearby objects (e.g., modular connectors, satellites, etc.). In various embodiments, the interface boards may include pogo pins, or any other suitable electrical connectors, to facilitate the connection of both male and female components. A pogo pin can include a spring-loaded pin that provides electrical connectivity from various positions of the spring. The pogo pins can counteract unwanted movement which might cause intermittent connections.

In the embodiment shown in FIG. 1B, four connection arms (e.g., claw assemblies) 114 can be seen extending upward and out from the corners of the face panel of the exemplary modular connector 100. Various mechanical components inside of the modular connector can facilitate the extension of the connection arms 114, which are further discussed below with reference to FIG. 2. In certain embodiments, the exemplary modular connector may include any number of connection arms 114 necessary to facilitate the functionality described herein (e.g., two, five, eight, etc.). The connection arm 114 can also be referred to as a connection claw. In particular embodiments, a connection arm 114 may include a substantially rectangular prism-shaped body 116 with a substantially triangular prism-shaped tip 118 at the top. In particular embodiments, the connection arm 114 may include one or more rotatable joints 120 whereby the body 116 and/or tip 118 of the connection claw can rotate forward or backward. In certain embodiments, the body of the connection claw may be in any suitable shape (e.g., prismatic including cylindrical, cuboidal, etc., or some other shape). In one embodiment, the tip 118 of the connection arm 114 extends outward at a more acute angle than the body 116 relative to the face panel 102. In various embodiments, the tip 118 and the body 116 of the connection arm 114 may extend at any suitable angle to achieve the functionality described herein.

Figure 2:
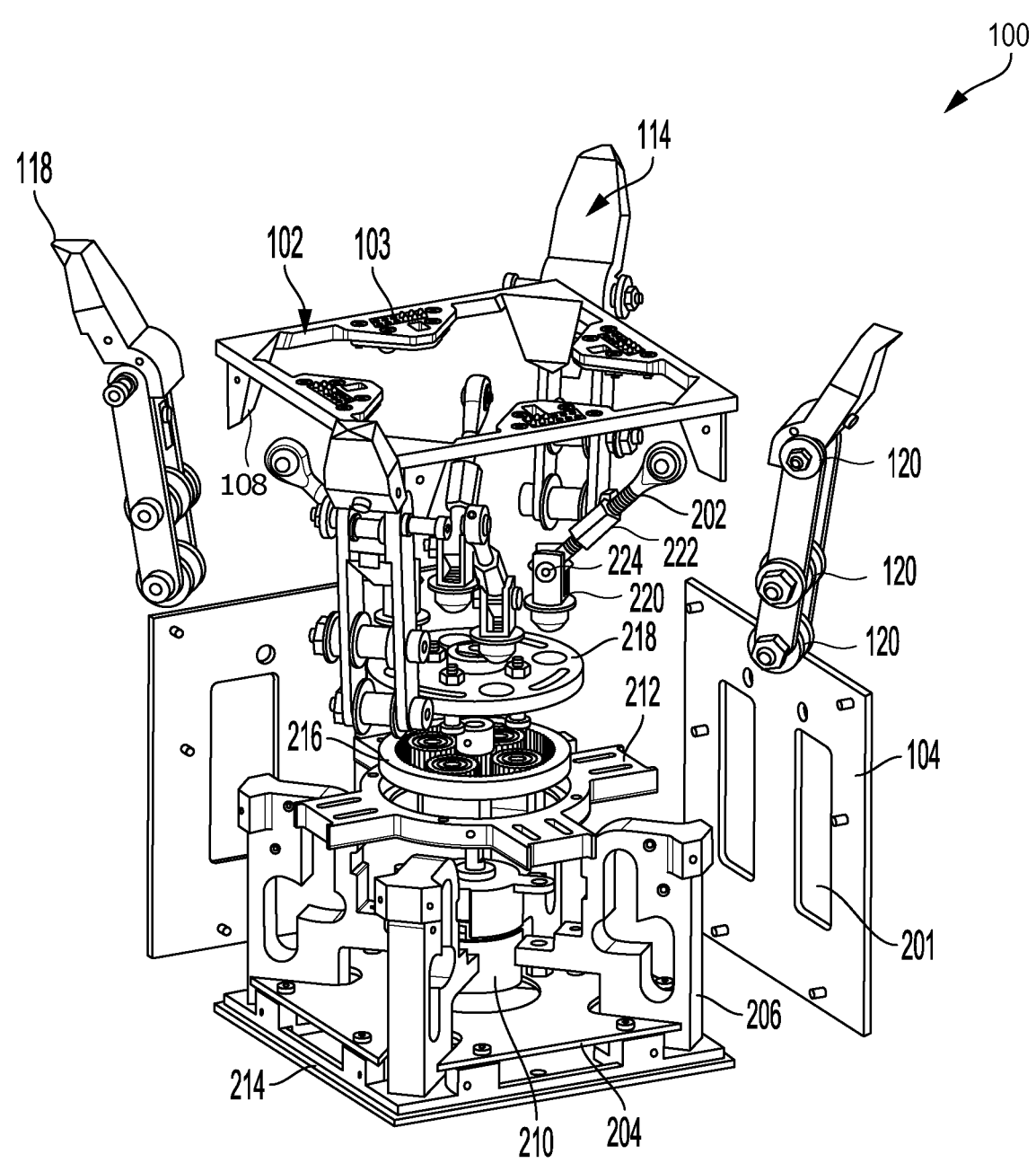
FIG. 2 illustrates an exploded view of an exemplary modular connector according to one embodiment of the present disclosure.

Turning now to FIG. 2, an exploded and disassembled view of an exemplary modular connector 100 is shown, according to one embodiment of the present disclosure, illustrating the various aspects of the modular connector. In one embodiment, a modular connector may include a face panel 102 and four side panels 104 that function as a casing for the modular connector 100. In certain embodiments, and as shown in FIG. 2, the side panels 104 may include one or more windows 201. In other embodiments, the one or more windows 201 may be omitted. In another embodiment, a modular connector may include a claw assembly (e.g., connection arms) 114 to facilitate a physical connection to an adjacent modular connector. In particular embodiments, a modular connector includes a swivel arm assembly 202 to facilitate motion of the claw assembly. In these embodiments (and others), the swivel arm assembly 202 includes a substantially vertical base 220 connected to an arm extension 222 by a rotatable joint 224. In some embodiments, the arm extension 222 connects to the claw assembly 114 to facilitate extension of the claw assembly.

In certain embodiments, a modular connector 100 includes a planetary gear assembly 216 to facilitate motion of the swivel arm assembly 202 (and connection arm 114). In various embodiments, a modular connector may include a gear mount 212 to provide structural support for the planetary gear assembly. In some embodiments, the planetary gear assembly 216 includes one or more notched circular gears that are interconnected with each other and connected to a motor 210. In particular embodiments, the motor provides torque to turn the planetary gear assembly 216 and engage a transfer disc 218. In at least one embodiment, the transfer disc helps convert the torque from the motor 210 into a substantially linear force to help move the swivel arm assembly 202, and ultimately, the claw assembly 114. In one embodiment, the transfer disc is substantially circular in shape. In another embodiment, the transfer disc 218 may be any suitable shape to perform the functionality described herein. In various embodiments, a modular connector 100 may include a track 206 to provide stability for the multitude of components. In these embodiments (and others), the track is connected to a base 214, whereby the base is the bottom surface of the modular connector 100. The modular connector 100 can be connected to a modular device, such as a spacecraft, at an exterior of the base, among other potential coupling positions. In at least one embodiment, the base 214 provides stability and support for a modular connector 100. In one embodiment, the base is substantially square-shaped. In another embodiment, the base 214 is substantially the same shape as the face panel 102. In some embodiments, the base may be any suitable shape to facilitate the functionality described herein.

In various embodiments, an exemplary modular connector 100 includes a main electronics circuit board 204 to provide power and facilitate control of the modular connector. In certain embodiments, the main electronics circuit board 204 provides connection support for a variety of components, including but not limited to: limit switches, proximity sensors, digital controllers, inertial measurement units, power connection sensors, and other suitable components. In some embodiments, the inertial measurement unit (IMU) can be a multi-axis IMU, such as, for example, a nine-axis IMU. In some embodiments, the main electronics circuit board manages data acquisition. In certain embodiments, the main electronics circuit board 204 communicates with the interface boards described above and controls the motor 210. In one embodiment, the main electronics circuit board may include four protruding sections, whereby the center of the main electronics board has a substantially circular aperture, and the ends of each protruding section are shaped like a portion of a triangle. In another embodiment, the main electronics 204 circuit board may be any suitable shape to perform the functionality described herein.

The motor 210 can be housed substantially within a body of the modular connector. When connecting to another modular connector as the male-selected modular connector, the motor can extend the claw assembly 114 first through an opening in a face plate of the male-selected modular connector and then similarly through an opening in the face plate of the female-selected modular connector. In some embodiments, the faceplate can include a cutout in the shape of an "X" to mechanically force the modular connector into axial alignment as the claw assembly 114 begin to latch. Other configurations of cutouts can also be included to force axial alignment. The claw assembly 114 of the female-selected modular connector can retract to provide room for the extending claw assembly 114 of the male-selected modular connector. The extending claw assembly 114 can latch within the body of the female-selected modular connector. The extending claw assembly 114 can retract to connect with the triangular tooth (or corner grip) 108 of the female-selected modular connector to provide structural support as is described herein. Upon retracting, the claw assembly can establish one or more interface connections between the male-selected modular connector and the female-selected modular connector. The interfaces can include electrical transfer, mechanical transfer, fluid transfer, and data transfer, among others. Before extending the claw assembly, the male and female-selected modular connectors can communicate wirelessly to establish a rendezvous routine. The modular connectors can, each together or a selected one, perform the automated rendezvous routine to become proximate to one another such that the extending claw assembly 114 is aligned with the opening in the faceplate of the female-selected modular connector.

Once connected, the male and female-selected modular connectors can disconnect and reconnect with other or the same modular connectors as desired. To disconnect, the male-selected modular connector can detach the interfaces and extend the claw assembly. The claw assembly 114 can be retracted from the body of the female-selected modular connector. Once disconnected, a new automated rendezvous routine can be determined for each modular connector. The gender for future connections by the male and female-selected modular connectors may or may not be based on the previous gender selections. Upon performing a new rendezvous routine, the modular connectors can connect with and disconnect with other modular connectors as desired and as described herein.

Figure 3B:
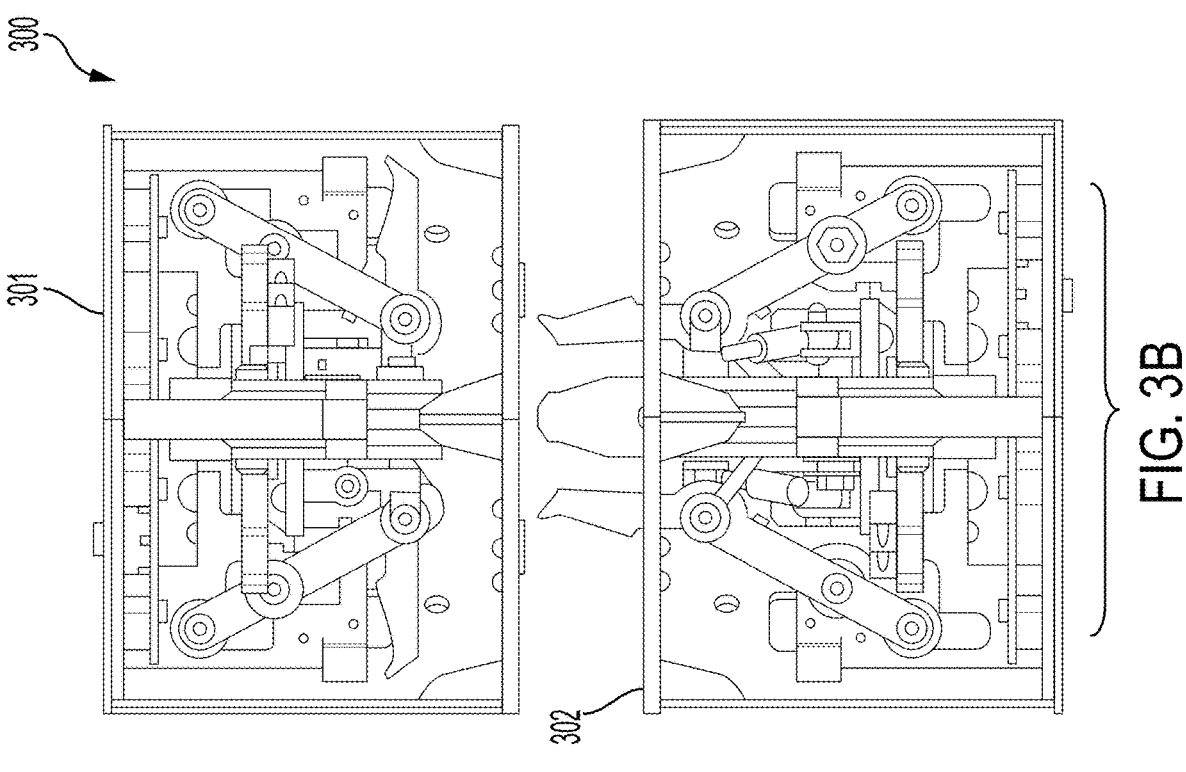
FIGS. 3A-3F illustrate an exemplary modular connector pairing sequence according to one embodiment of the present disclosure.
Figure 3A:
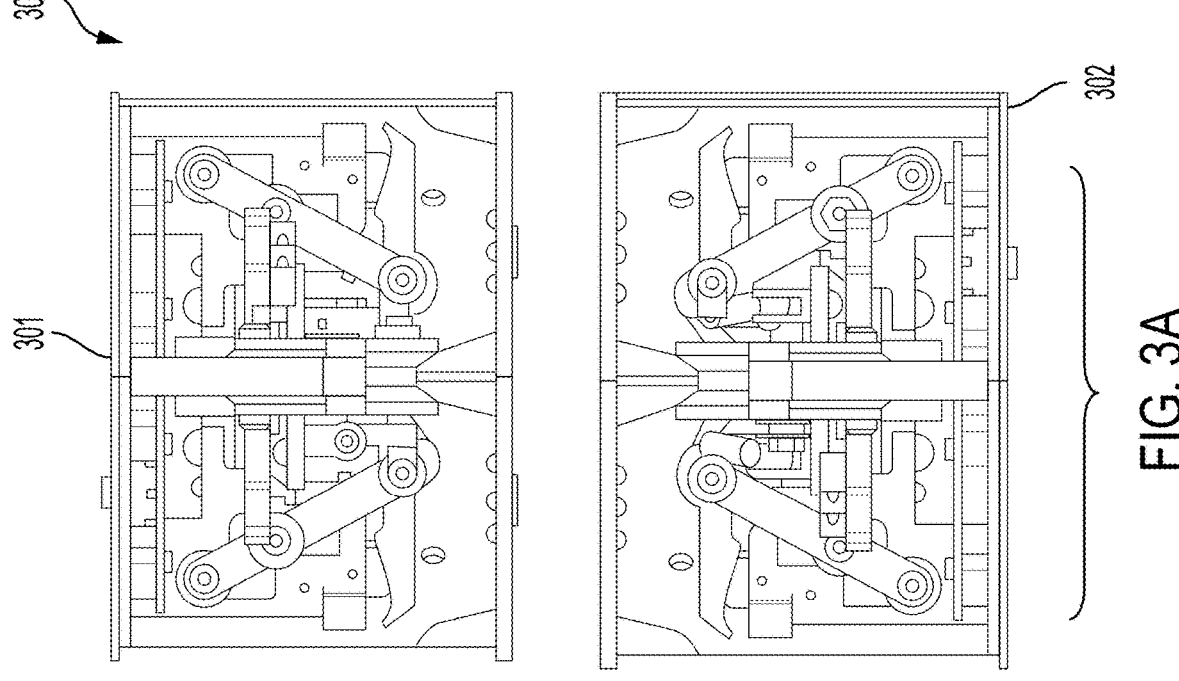

Now referring to FIGS. 3A-3F an exemplary modular connector pairing sequence 300 is shown, according to one embodiment of the present disclosure. In one or more embodiments, the pairing process may begin when two devices (e.g., modular connectors 301 and 302) initiate a rendezvous routine. The two devices can communicate via a wireless communication means to exchange data used to determine the rendezvous routine. The data can include a current location and orientation of each device. As used herein, a rendezvous or rendezvous routine is a series of maneuvers designed to bring a spacecraft from orbital insertion to the near-proximity of another spacecraft already in orbit, as shown in FIG. 3A.

A computing device on the electronics board can be used to identify a desired meeting point in space for the rendezvous and compute the series of maneuvers to bring the modular device to the near-proximity of another modular already in orbit. The computing device can determine the series of maneuvers in order to minimize energy necessary for the rendezvous. The computing device can access data describing an estimated electrical energy necessary to perform each of the maneuvers that the modular connector is capable of performing. The estimated electrical energy may be based on capabilities, size, and weight of a modular device (or series of modular devices and modular connectors) coupled to each modular connector involved in the rendezvous. The computing device can cause the modular connector and/or modular device to perform the series of maneuvers. While performing the maneuvers, the computing device can continually update the series of maneuvers based on sensor measurements during the rendezvous. The computing devices on the pairing two or more modular connectors can communicate wirelessly to determine and continually update the maneuvers until rendezvous is complete.

In at least one embodiment, the modular connectors may share and collect attitude information prior to docking. In these embodiments (and others), infrared LEDs may be used to facilitate collection of attitude information. In particular embodiments, upon rendezvousing, the pairing modular connectors 301 and 302 initiate docking. In these embodiments, due to the androgynous nature of the modular connectors, during the docking initiation, the pairing modular connectors determine which device will function as a male and which device will serve as the female. This on-the-fly determination of connector gender roles, in combination with the modular connector's small size, multiple docking orientations (e.g., modular connectors may accept docking in two rotational orientations 180 degrees apart, or four rotational orientations 90 degrees apart), and soft and hard capture capability (as will be discussed herein), establish a notable improvement over previous technology, which was more limited and less efficient. In one embodiment, the connector gender roles can be determined based on the current operational status of both connecting devices. As an example, if a connection arm 114 on one of the devices is inoperable, the other device can function as the male-selected modular connector 302. The gender of the connectors can also be selected based on random selection, a status of existing gender connections for a set of modular connectors, based on capabilities of each modular connector, or through some other means. As an example, a first modular connector may be selected as a male connector if a second modular connector corresponds to a different revision for the modular connector that lacks a desired capability of the connection arm of the first modular connector.

Figures 3C, 3D:
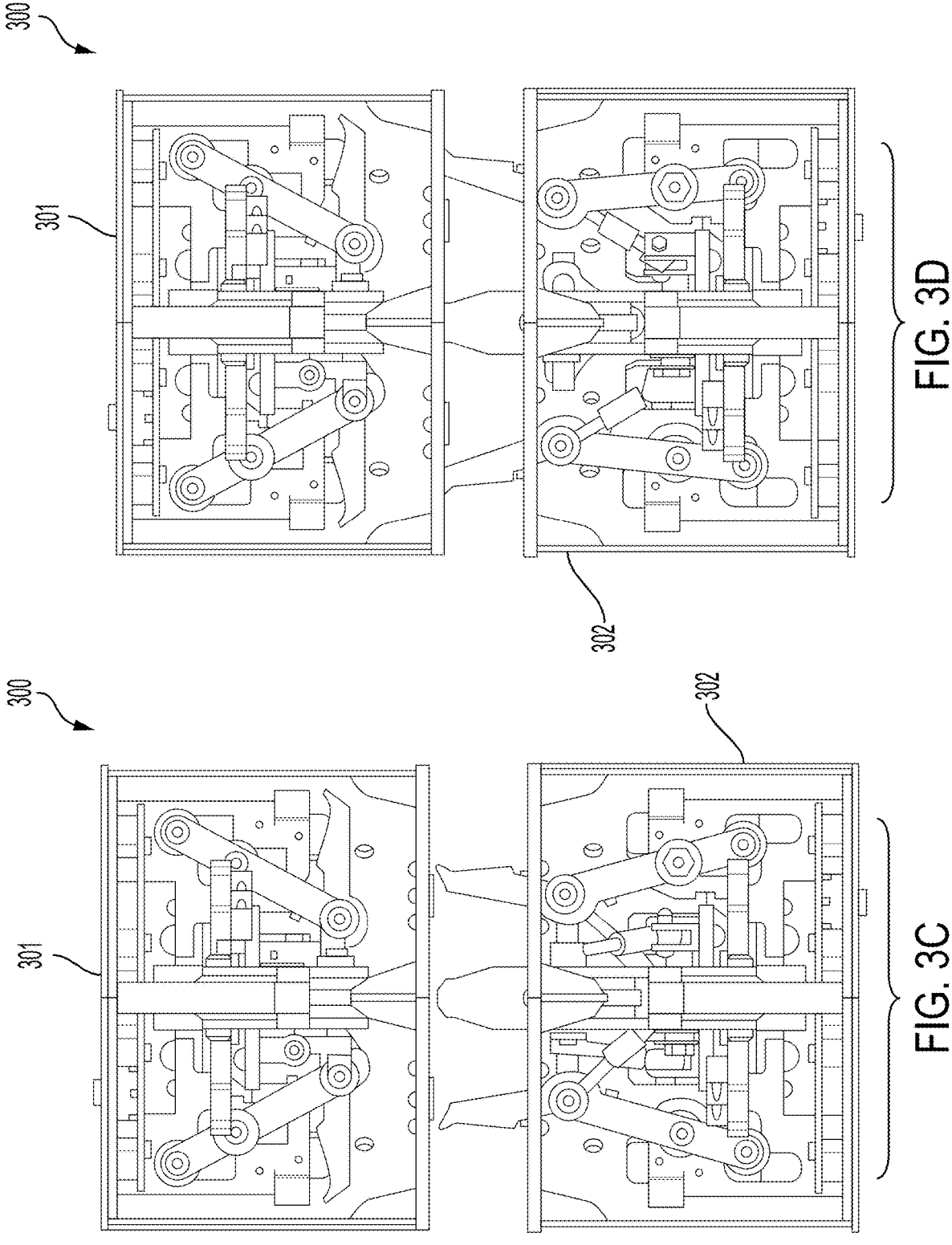

In various embodiments, the pairing process continues with the two modular connectors 301 and 302 completing a soft capture, where the claw assembly of the male-selected modular connector 302 is securely attached to the face panel of the female-selected modular connector 301. The claw assembly includes four arms that each correlate to a corner of the modular connector. In one or more embodiments, the claw assembly extends outward from the face panel of the male-selected modular connector. In these embodiments, and as shown in FIG. 3B, the claw assembly begins its extension with each of the four arms substantially positioned towards the center of the face panel in a position where the four arms are proximate to one another. In various embodiments, and as shown in FIG. 3C, as the claw assembly further extends out from the male-selected modular connector 302 and into the female-selected modular connector 301, the arms of the claw assembly extend from the center and towards the corners of the female-selected modular connector 301. In particular embodiments, and as shown in FIG. 3D, the claw assembly then latches onto the corners of the face panel of the female-selected modular connector 301.

Figures 3E, 3F:
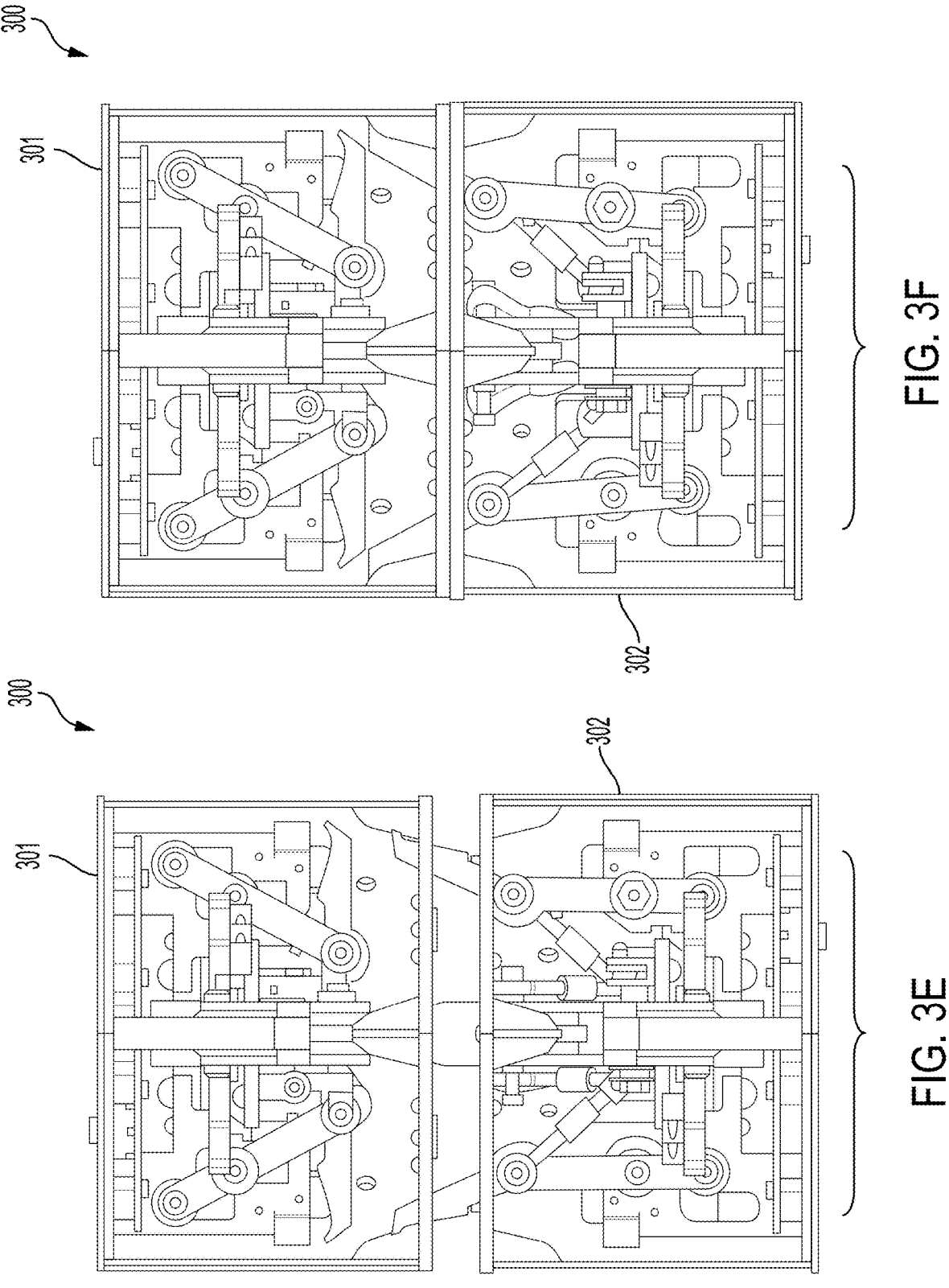

Next, in certain embodiments, and as shown in FIG. 3E, the modular connectors pull each other towards one another via a motor or other force generating device. In at least one embodiment, upon latching onto the corners of the female selected modular connector 301, the connection arms of the male selected modular connector 302 pulls the female selected modular connector 301 towards itself. The face panel of the female modular connector 301 can include a contoured surface or corner grip for the tip of the connection arms of the male selected modular connector 302 to fit within. The corner grip can inversely mirror a contour of an outside of the tip of the connection arm. The corner grip can be angular to provide support for both forces in a direction perpendicular to the face panel and parallel to the face panel. The angular nature of the corner grips can force the modular connectors to be forced together when the connection arm pushes outwards. As an example, when each of the connection arms of the male selected modular connector 302 contact a corresponding contoured surface of the face panel for the female selected modular connector 302, the connection arms can pull against the contoured surface to provide structural support. The structural support can include support for pulling or outward forces and shearing forces. The connection arms are also constrained to a specific motion based on the tracking formed in part by the corner grips.

In the event that two modular connectors are not properly aligned, in various embodiments, the proximity sensors and inertial measurement units on the modular connectors can facilitate realignment of the modular connectors without the need for human input. In particular embodiments, the pairing process ends upon completion of a hard capture. In these embodiments, a hard capture is completed upon establishing a surface connection as shown in FIG. 3F, such that data and power may be transferred between the male selected modular connector 302 and female selected modular connector 301. In one or more embodiments, the pairing process is sensor-controlled and may take less than five seconds to complete.

Figure 4A:
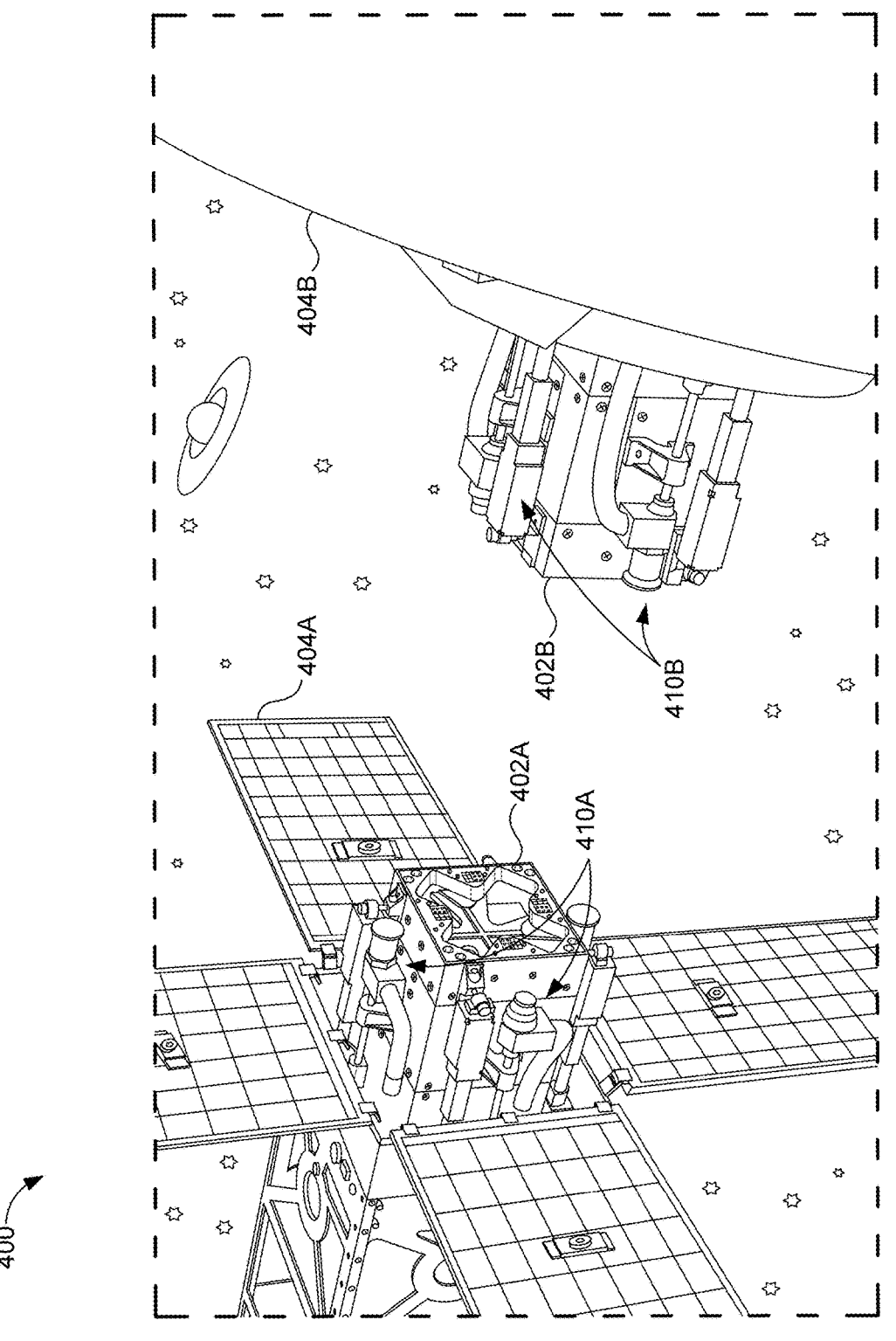
FIG. 4A-4B illustrate exemplary modular fluid interfaces in an operational environment according to one embodiment of the present disclosure.

Now referring to FIG. 4A, an example operational environment 400 is illustrated in which a plurality of the disclosed fluid interfaces are each shown in unmated states. In particular, the example operational environment 400 of FIG. 4A shows a modular connector 402A and a modular connector 402B (also referred to herein as host structures), both of which are operatively connected to respective equipment modules in outer space. For example, and as shown in the example operational environment 400, the modular connector 402A can be operatively connected to an equipment module 404A, and the modular connector 402B can be operatively connected to an equipment module 404B. In one example, the equipment module 404A can include a satellite, a space capsule, or similar equipment. For purposes of example and discussion, the equipment module 404B can include one or more fueling containers, carriers, canisters, etc. As will be described in greater detail herein, the equipment module 404A can require periodic refueling and/or replenishing of one or more fluids. For example, the module 404A (and any humans therein) can require fuel in liquid and/or gas form, oxygen, water, pressurants, propellants, and various other types of fluid. In other examples, specific fluids not typically carried aboard the equipment module 404A may be needed to accomplish certain tasks, missions, etc., inside or outside the equipment module 404A. Accordingly, various aspects of the present disclosure discuss a technical solution for transporting and transferring fluids between two (or more) modules, such as between the equipment modules 404A and 404B (or the modular connectors attached thereto). In particular, the present disclosure discusses systems and processes for automatically initiating sealed connections between gendered, or androgynous, valves in one or more fluid interfaces under various operating conditions (under vacuum, high-pressure, etc.).

In at least one example, systems disclosed herein include one or more fluid interfaces for transferring fluid between two (or more) equipment modules, such as between the equipment modules 404A and 404B. As illustrated in the operational environment 400, a plurality of fluid interfaces 410A are operatively connected to the modular connector 402A, and a plurality of fluid interfaces 410B are operatively connected to the modular connector 402B. The fluid interfaces 410A and the fluid interfaces 410B are operatively configured such that the fluid interfaces 410A and the fluid interfaces 410B are compatible mates for securely attaching with each other. As will be discussed in greater detail herein, and in response to the modular connector 402A and the modular connector 402B rendezvousing and docking, the fluid interfaces 410A and the fluid interfaces 410B can engage in a process by which specific components of the fluid interfaces 410A and the fluid interfaces 410B connect to form a secure seal.

Figure 4B:
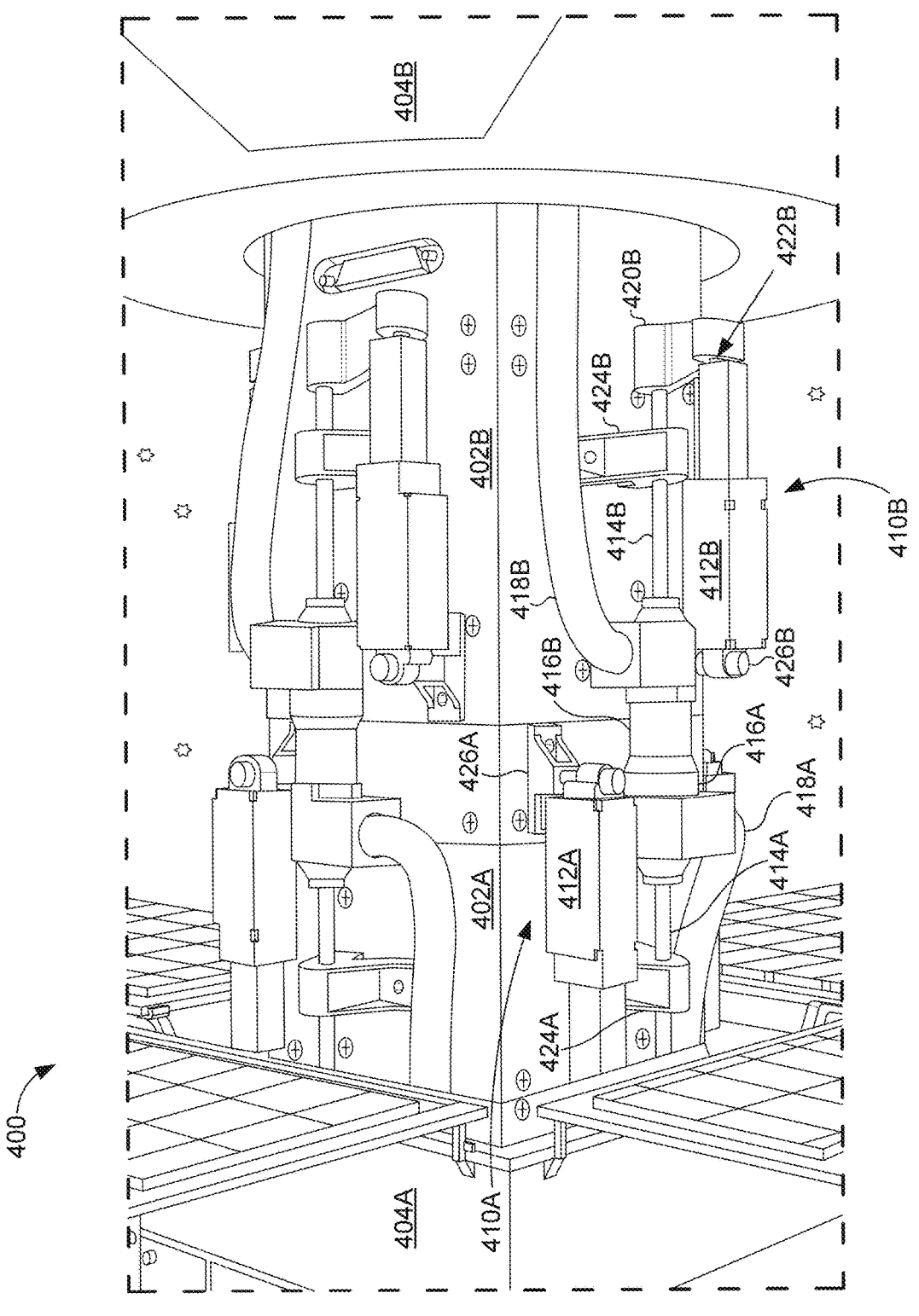

For example, consider the scenario as illustrated in the operational environment 400, in which the equipment module 404A and the equipment module 404B are approaching one another in outer space. In response to the to the modular connector 402A and the modular connector 402B rendezvousing and docking (as illustrated in FIG. 4B), a process can be automatically initiated by which one or more of the fluid interfaces 410A and the fluid interfaces 410B are activated to form secure connections with each other to establish a seal sufficient for fluid transfer in outer space. In one example, establishing a seal allows for fluid to be transferred from the equipment module 404B, through the connected fluid interfaces, and into the equipment module 404A.

Referring to FIG. 4B, the example operational environment 400 is shown with the disclosed fluid interfaces in a mated state. Connection of the fluid interfaces 410A and 410B (collectively referred to as the fluid interfaces 410) can begin in response to a docking between the modular connector (host structure) 402A and the modular connector (host structure) 402B. For case of description, the modular connectors 402A and 402B are collectively referred to throughout the present disclosure as the modular connectors 402 or the host structures 402. The connection of the fluid interfaces 410 can begin at any other time as needed operationally. Connecting the host structures 402 before initiating the fluid interfaces 410 connection, along with strong actuators and dedicated hardware for handling the fluid pressure, can allow the system to operate at a high Maximum Expected Operating Pressure (MEOP). For example, the manifolds can exert up to 5,000 lbf on the valves. In at least one example, and the system can be configured to withstand pressures of up to about 6,000 psi (which constitutes a high MEOP). In another example, specific fluid interfaces can be configured to exert pressures of about 6000 psi for tubes with diameters of about 0.5 inches, which amounts to about 1178 lbf. The host structures 402 can include an electrical loopback circuit (or a similar circuit or sensor) to verify successful host structure mating. In one example, the fluid interfaces 410 can include independent sensors for verifying structural connection, such that the independent sensor need not rely on signals received from its mated fluid interface for verifying a successful connection. In one example, the mating of the host structures 402 can include a set of complementary pins and sockets through which electrical signals may be transmitted. The tight mechanical contact required for the pins and sockets to transmit an electrical signal may indicate a successful mechanical mate between the host structures 402.

In at least one example, the fluid interfaces 410 can integrate with various host vehicle fluid systems, and the fluid interfaces 410 can accommodate the back-pressure that drives fluid through the fluid interfaces 410 in the relative absence of gravity. The fluid interfaces 410 can minimize the interstitial volume between valves, minimizing the amount of spill upon disconnection. Minimum-spill systems are preferred in applications, as fluids are more likely to evaporate under external vacuum conditions and become problematic to nearby components (e.g., optics, sensors, sensitive materials). The capability to withstand high MEOP and the minimum-spill design can allow the fluid interfaces 410 to connect and disconnect while filled with (or without) pressurized fluid, allowing for operational flexibility. In some embodiments a purge system or vent system can be included in the fluid interface 410. The purge system can remove problematic fluids with inert fluids, mitigating the negative effects of spills.

The fluid interfaces 410A and 410B can each be mounted to representative host structures 402A and 402B. The fluid interfaces 410 can leverage the existing alignment of the host structures 402. In one example, reducing the burden of alignment on the fluid interfaces 410 reduces the need for alignment features and compliance features on the fluid interfaces 410, which results in reduced the mass, volume, and complexity of the fluid interfaces 410. The performance of the fluid interfaces 410 can be enhanced by delegating the majority of the load bearing to the host structures 402. By doing so, the components of the fluid interfaces 410 may be subjected to reduced mechanical stress, which can improve the component's durability and reliability. This load distribution can allow the fluid interfaces 410 to maintain precise alignment and secure connections, even under varying operational conditions. The host structures 402, can handle substantial mechanical loads, provide a stable foundation, and ensure that the fluid interfaces 410 operate within optimal parameters. This approach minimizes wear and tear on the fluid interfaces 410 components, reducing the likelihood of mechanical failures and extending the overall lifespan of the system. By offloading the structural load to the host structures 402, the fluid interfaces 410 can be designed with lighter and more compact components, improving the system's size, weight, and power (SWaP) efficiency. For example, in a spacecraft fluid transfer system, the host structure 402 can absorb the forces generated during docking and fluid transfer, allowing the fluid interface 410 to function smoothly and reliably.

In one example, the fluid interfaces 410A and 410B can include actuators 412A and 412B (collectively referred to herein as actuators 412), mechanical linkages 414A and 414B (collectively referred to herein as mechanical linkages 414), quick release/disconnect valves 416A and 416B (collectively referred to herein as valves 416), and tubes 418A and 418B (collectively referred to as tubes 418). In at least one example, the valves can be quick release valves operatively configured to allow for rapid fluid pressure venting when control signals are removed, or when the valves are disconnected due to force. In another example, the valves can also include one or more locking features. Each component of the fluid interfaces 410 can be mounted onto the respective host structures 402A and 402B.

The fluid interfaces 410 can be modular assemblies that can be added to the host structures 402. The fluid interfaces 410 can be installed, mounted, or retrofitted onto the host structures 402 without extensively disassembling or modifying either the host structures 402 or the fluid interfaces 410 themselves. The modular implementation of the fluid interfaces 410 can allow for the fluid interfaces 410 to be quickly and easily installed, uninstalled, relocated, updated, or repaired during manufacture of the host structures 402, after the host structures 402 are manufactured, or while the host structures 402 are in use. The modular implementation of the fluid interfaces 410 can facilitate the addition of multiple fluid interfaces to a single host structure. The multiple fluid interfaces 410 can allow for the transfer of multiple fluids between vehicles. The multiple fluid interfaces 410 can enable compatibility between multiple combinations of vehicles and valves in various orientations. The multiple fluid interfaces can increase fluid transfer capacity by simultaneously transferring fluid through each connected interface. Multiple fluid interfaces can have the benefit of redundancy by allowing for one or more secondary fluid interfaces to be connected in the event that a primary fluid interface malfunctions or becomes inoperable. The fluid interfaces 410 can be connected or disconnected independently of the host structures 402, allowing individual control of specific fluid interfaces. The fluid interfaces 410 provide operational flexibility, such as the fluid interfaces 410 can be connected or disconnect as needed without disturbing structural connections between equipment vehicles. The fluid interfaces 410 can support any type of gendered valves and androgynous (non-gendered) valves. The delivery of fluid to the fluid interfaces 410 can be accomplished via one or more tubes, such as tubes 418. The tubes 418 can be operatively connected to the valves 416 with threaded connections. In one example, the tubes 418 are operatively connected to the valves 416 via a clamp, fitting, or similar hardware. Some embodiments may utilize any permanent or detachable connection with flexible tubes, or rigid tubes. In certain examples, the tubes can be housed within the host structures. Some embodiments may utilize hollow spaces within structural components to deliver fluid. For example, mechanical linkages 414 can be hollow and filled with fluid, delivering fluid directly to the valves 416 that the mechanical linkages 414 may be supporting structurally.

According to one example, tubes 418 can also be referred to throughout the present disclosure as "interconnects" or "interconnect components." The interconnect components can ensure that fluid can be transferred efficiently and reliably, even when there is relative movement between the connected parts. The interconnect components can accomplish fluid transfer from one or more fluid manifolds (not shown in FIG. 4B) that may be fixed to the respective host structures 402, while the fluid interfaces 410 moves axially to connect to the other half. The interconnect component can be flexible enough to accommodate axial movement and misalignment between the fluid interfaces 410 host structures 402. The flexibility can aid in maintaining a sealed connection during the movement of the valves 416. The interconnect component can provide a leak-free seal to preventing fluids and gases from escaping during transfer. The leak-free seal can be achieved through the use of materials and designs that can withstand high pressures and maintain their integrity under various operating conditions. In at least one example, the tubes 418 provide fluid pathways from the valves 416 (to which they are connected at one tube end) to manifolds (to which they are connected at an opposite tube end).

In at least one example, the interconnect components can be manufactured from a ductile material, such as stainless steel or another suitable material, which is both rigid but also flexible. According to various aspects of the present disclosure, the interconnect components, can be stainless steel tubes manufactured in various shapes, such as coiled springs, planar springs, bellowed tubes, serpentine shapes configured to weave within fluid interface components and other components mounted to a host structure, etc. The interconnect components can also be manufactured as corrugated hoses, braided hoses, and other flexible configurations. In various embodiments, manufacturing the interconnect components from ductile metals and other flexible materials can allow for the interconnect components to extend in length, with minimal required force, as the valves 416 to which they are connected move towards a target fluid interface for mating. Moreover, manufacturing the interconnect components from ductile metals and other flexible materials results in the interconnects retracting (with minimal restoring force) to their original shapes and configurations in response to their respective valves disconnecting from target valves. The interconnect components can be resistant to corrosion.

In various embodiments, the interconnect components can include bellows. The bellows can be corrugated, flexible tubes made from stainless steel. The bellowed tubes can allow for axial elongation and lateral movement in response to applying a relatively low force to the bellowed tube. In at least one example, the interconnect components can include coiled hard lines. The coiled hard lines can be made from stainless steel or other metals. The coiled hard line can act as spring to enable extension and contraction while maintaining structural integrity. The coiled hard lines can absorb vibrations from the host structure, and thus the coiled hard lines can reduce (or avoid) damage due to such vibrations. In another example, the interconnect components can include serpentine hard lines. The serpentine hardlines can be a flexible, snake-like shape that can bend and flex around other components. The serpentine design can accommodate movement and misalignment. In another example, the interconnect components can be a flex hose. The flex hose can include corrugated stainless steel or PTFE (Polytetrafluoroethylene) tubes with steel braided exteriors. The flex hose can accommodate the movement of the fluid interfaces 410 without requiring additional actuation force. In another example, the interconnect components can include rigid components with sliding seals such as linear joints or pistons, telescoping tubes, and rotating joints. The interconnect components can be compliant mechanisms that enable motion from inherent characteristics.

In one example, actuators 412 can provide force to connect and disconnect the valves 416 (e.g., male-gendered quick disconnect valve and female-gendered quick disconnect valve). This motion can be activated manually or using an autonomous system. In another example, the actuators 412 can provide force in one direction (e.g., only connecting or disconnecting), and another component, such as a spring, can provide force for the opposite motion when the actuators 412 are de-energized. The actuators 412 can include an electric actuator, a pneumatic actuator, a hydraulic actuator, solenoid actuator, or any other suitable type of actuator. The actuators 412 can draw electrical power, fluid pressure, heat, or another form of energy from the host structures 402. In some embodiments, the actuators 412 can be powered independently. The actuators 412 can leverage the alignment and load-bearing capacity of the host structures 402 to ensure precise and reliable valve connections. The actuators 412 can be part of a modular assembly, allowing for easy installation, uninstallation, and maintenance without extensive modifications to its respective host structure. The actuators 412 can include features to protect against adverse environmental factors such as temperature, humidity, radiation, and pressure. The features can include insulation, coatings, shielding elements to block radiated heat, heat spreaders, heaters, phase change materials, active or passive cooling systems, thermal storage devices, or any other relevant protective feature. The fluid interfaces 410 can include sensors to monitor the performance of the actuators 412, detect leaks, and verify successful connections. The actuators 412 can be configured to operate independently or in conjunction with other actuators to support multiple fluid interfaces on a single host structure. The hardware configuration and operational sequence can be replicated on one or more sides of the host structures 402, depending on the specific application and without loss of functionality. Each valve-to-valve mate can be actuated independently. Multiple valves could be actuated by a single actuator with linkages to multiple valves.

In one example, the actuators 412 can transmit mechanical power to the valves 416 through the mechanical linkages 414. For example, and as shown in FIG. 4B, the valve 416B of the fluid interface 410B is coupled to, or operatively connected to, the actuator 412B via a mechanical linkage 414B and an arm 420B. As shown in the present embodiment, the arm 420B is connected to an actuator rod 422B of the actuator 412B. Accordingly, and in response to activating the actuator 412B, as the actuator rod 422B is extended from (or retracted into) the actuator 412B, the mechanical linkage 414B performs the same movements due to the mechanical linkage 414B and the actuator rod 422B being connected by the arm 420B. In this way, the valve 416B can be moved towards or away from a target valve (such as the valve 416A) for connecting or disconnecting from the target valve. In at least one embodiment, a brace 424B can be mounted onto the host structure, and the brace 424B can include an opening through which the linkage 414B can travel. In various embodiments, the bracket 424B can provide structural support to the linkage 414B, and the bracket 424B can ensure that the linkage 414B travels along its axial plane with minimal (or zero) deviation to ensure a secure connection with the target valve. Further, the actuator 412B can be mounted to the host structure 402B via one or more actuator mounts 426B, and thus the actuator 412B can remain stationary while activated and thereby allowing for the energy and force exerted by the actuator 412B to be transferred to the valve 416B via the actuator rod 422B, the arm 420B, and the mechanical linkage 414B. In various embodiments, the actuator 412B can be mounted on the stationary (or moving) portions of the fluid interface 410B. While not explicitly discussed, it should be understood that the components on the fluid interface 410B, such as the actuator rod 422B, the arm 420B, the bracket 424B, and the actuator mount 426B, are substantially similar to the actuator rod 422A, the arm 420A (not shown), the bracket 424A, and the actuator mount 426A, and other similarly labeled components from fluid interface 410A.

The mechanical linkages 414 can include a rigid structural component (e.g., rod) that can form the primary structure of the linkage. In some embodiments, the mechanical linkages 414 can be a compliant or flexible structural component, moving components such as bell cranks, belts, chains, gears, lead screws, rack and pinions, cams, cables, magnets, friction, or one of numerous similar mechanisms. In some embodiments, the mechanical linkages 414 can include a fluid-based system such as a set of hydraulic or pneumatic pistons. The mechanical linkages 414 can provide a direct path for force transmission from the actuators 412 to the valve components (e.g., male-gendered quick disconnect valve and female-gendered quick disconnect valve). The mechanical linkages 414 can include joints and bearings that allow for smooth and precise movement. The joints can be pivot points or sliding interfaces, depending on the specific design requirements.

Mounting brackets, such as the brackets 424A and 424B, can secure the mechanical linkages 414 to the host structures 402 and ensure proper alignment with the actuators 412 and valve components 416. In an initial state, the mechanical linkages 414 can remain in a neutral position, ready to transmit force when the actuators 412 are activated. When the actuators 412 are activated, the mechanical linkages 414 can move and transmit the force to the valves 416, moving the valves 416 into the desired position for connection or disconnection. The actuators 412 can remain stationary because this force is reacted by the host structures 402, allowing the valves 416 to connect while under pressure, providing initial alignment, and allowing the valves 416 to contain spring loaded features or other features that require force to connect.

The mechanical linkages 414 can hold the valves 416 in place during fluid transfer, ensuring a secure and stable connection. Upon receiving a disconnection command, the mechanical linkages 414 can be reversed by the actuators 412, separating the valves 416 and terminating the fluid transfer. The mechanical linkages 414 can ensure precise alignment of the valves 416, minimizing the risk of leaks or misalignment during connection and disconnection. The materials and construction of the mechanical linkages 414 can withstand the forces exerted by the actuators 412. The mechanical linkages 414 can be made of strong and light-weight materials such as stainless steel, aluminum alloys, titanium alloys, carbon fiber, composite materials, brass, engineered plastic, or any other suitable material.

The actuators 412 can accommodate various valve types, including quick-disconnect valves, quick release valves, gendered and androgynous valves, and other valves, thus providing operational flexibility. The actuators 412 can position the valves 416. The valves 416 can provide a secure and efficient means of connecting and disconnecting fluid lines within the fluid interfaces 410. The valves 416 can enable a leak-free connection and allow for rapid coupling and decoupling. The main structure of the valves 416 can be made from durable materials (such as pressure resistant metals) to withstand fluid pressure and environmental conditions. The valves 416 can include features to protect against adverse environmental factors such as temperature, humidity, radiation, and pressure. The features can include insulation, coatings, shielding elements to block radiated heat, heat spreaders, heaters, phase change materials, active or passive cooling systems, thermal storage devices, or any other relevant protective feature. The valves 416 can be made of stainless steel, brass, aluminum, engineered plastic, or any other suitable type of material. The valves 416 can handle high fluid pressure, allowing the fluid interfaces 410 to operate at a high Maximum Expected Operating Pressure (MEOP). In one example, the valve 416A as shown in FIG. 4B can mate with valve 416B to establish a fluid transfer path between the fluid interfaces 410. The locking and sealing mechanisms of both valves 416 can work together to ensure a secure and leak-free connection.

In various embodiments, fluid can enter and exit the fluid interfaces 410 through ports at the non-mating outlets of the valves, which can be tailored for each application. The fluid interfaces 410 can include tubes connected to valve ports and/or manifold ports (or similar interconnecting devices) for transporting fluids through the fluid interfaces 410. In one example, the actuators 412 can remain in a standby mode, or a generally inactive state, until a connection or disconnection command/indication is received or detected. For example, the actuators can remain in an inactive state until receiving an indication that the host structures have successfully docked with each other. In response to detecting a docking (or undocking), the actuators 412 can expend energy to move the mechanical linkages 414. The mechanical linkages 414 can move the valve components (e.g., male-gendered quick disconnect valve 416A or female-gendered quick disconnect valve 416B) into close proximity of the corresponding valve component, aligning and mating the valves to establish a fluid transfer path. The actuators 412 can provide continuous force to keep the valve components securely mated during fluid transfer operations. When a disconnection command, instruction, or signal is received, the actuators 412 can reverse the process, moving the mechanical linkages 414 to separate the valve components. This process can terminate the fluid transfer, or the fluid transfer can terminate prior to disconnecting the valves 416. The actuators 412 can leverage the alignment and load-bearing capacity of the host structures 402 to ensure precise and reliable valve connections. The actuators 412 can be part of a modular assembly, allowing for easy installation, uninstallation and maintenance without extensive modification to the host structures 402. The actuators 412 can be configured to operate independently or in conjunction with other actuators to support multiple fluid interfaces 410 on a single host structure 402. The configuration of the valves 416 and operational sequence can be replicated on one or more sides of the host structures 402, depending on the specific application and without loss of functionality.

Figure 5A:
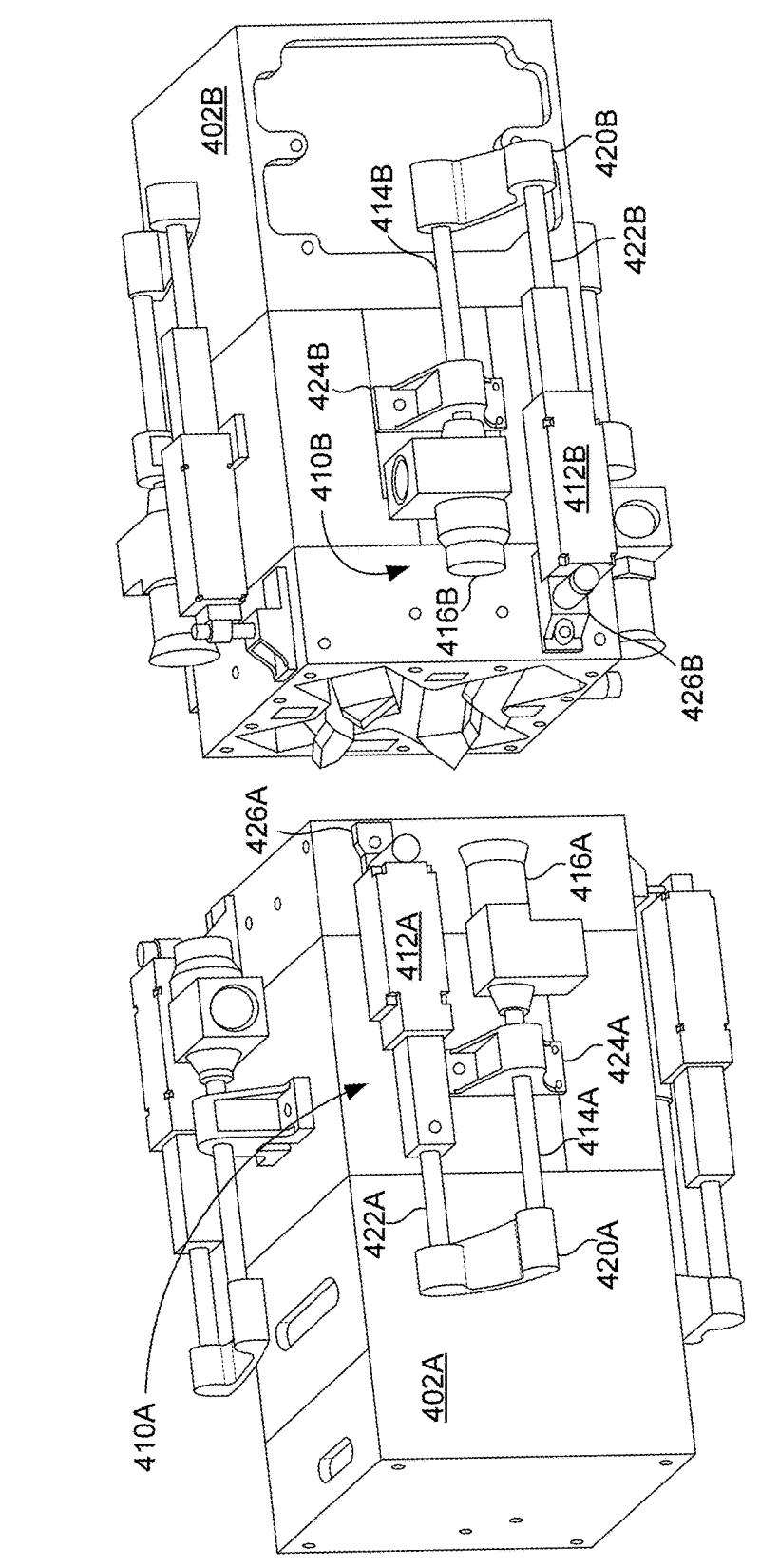
FIGS. 5A-5C illustrate an exemplary modular fluid interface mating sequence according to one embodiment of the present disclosure.
Figure 5B:
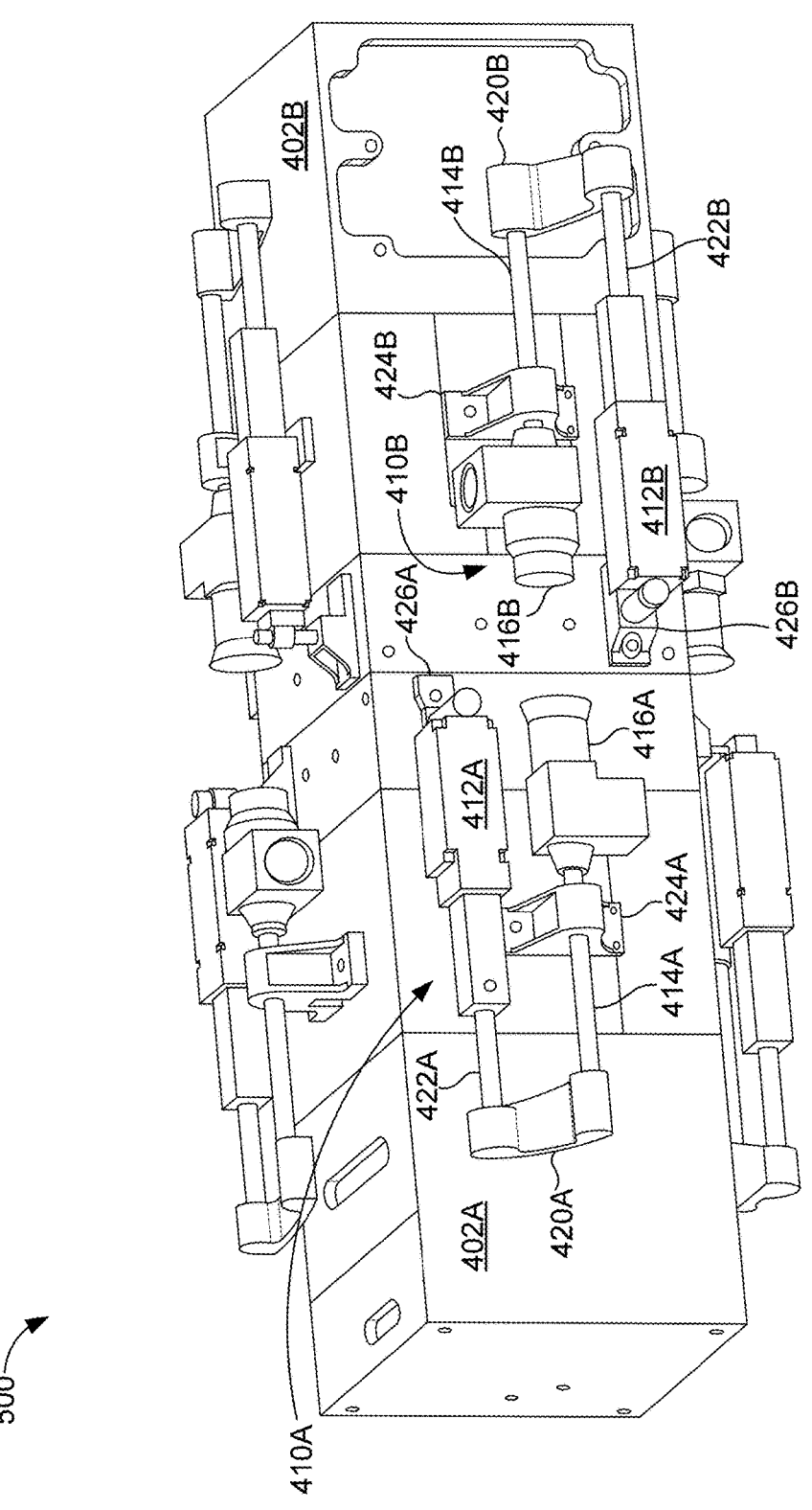
Figure 5C:
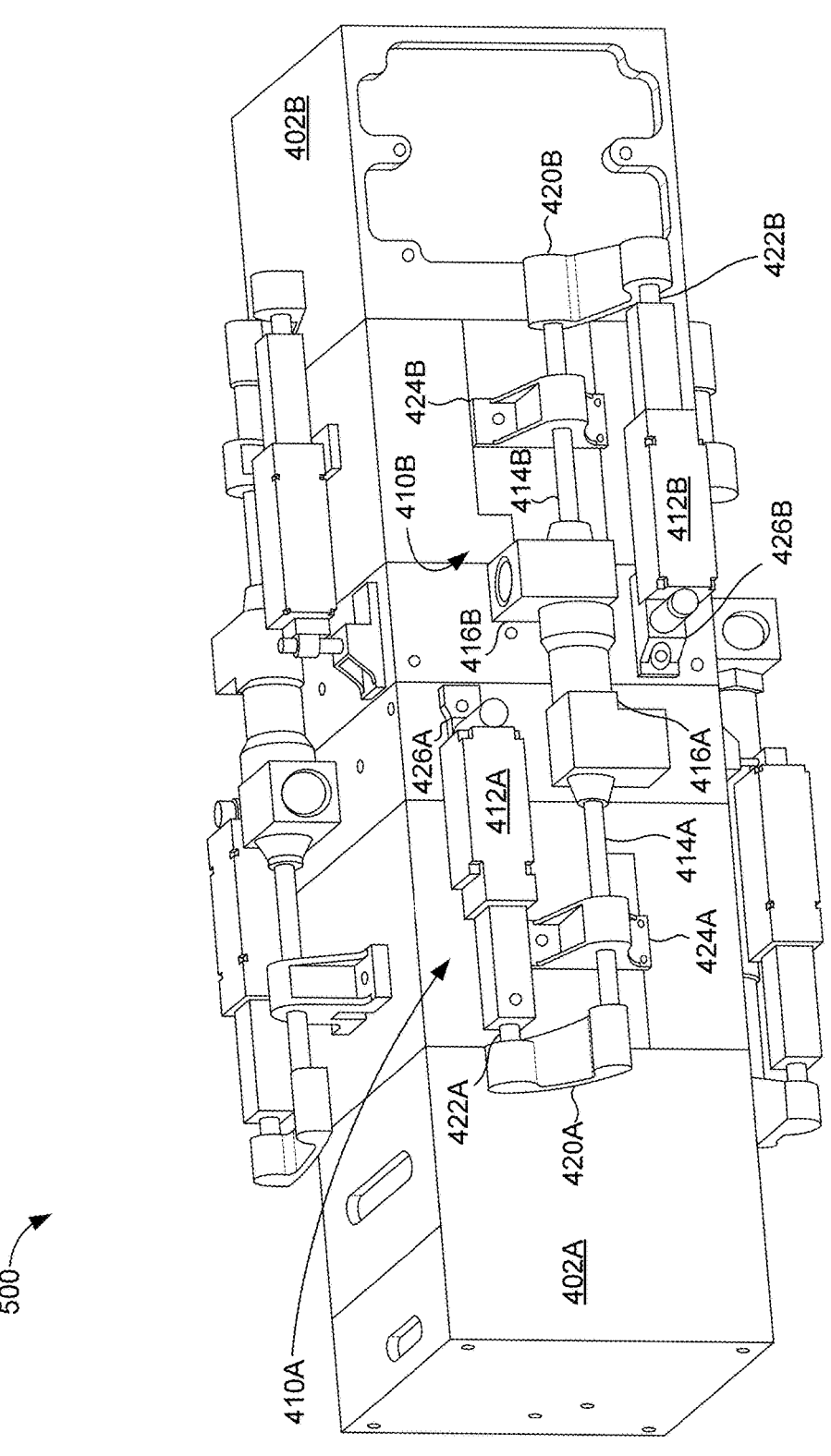

Referring now to FIGS. 5A-5C, various steps of a fluid interface mating sequence 500 are shown, according to one embodiment. In at least one example, FIGS. 5A-5C illustrate the host structures 402A and 402B, outside of the operational embodiment illustrated in FIGS. 4A-4B, for purposes of clarity and explanation with respect to the mating sequence 500. According to various aspects of the present disclosure, the host structures 402A and 402B can include a plurality of fluid interfaces 410 mounted on various exterior sides of the host structures 402. Including a plurality of fluid interfaces 410 mounted on various exterior sides allows for the fluid interfaces 410 to mate under a plurality of docking configurations. The sequence 500 can be replicated on one or more sides of the host structures 402, depending on the specific application and without loss of functionality. Each valve-to-valve mate can be actuated independently, although multiple valves could be theoretically actuated by a single actuator with linkages to multiple valves. The embodiment shown in FIGS. 5A-5C illustrates a single fluid interface mounted on each exterior side of the host structure (not including the host structure base(s)); however, it should be understood from the discussion herein that various valve, actuator, and manifold configurations are possible depending on mission needs. In at least one embodiment, features may be present that require motion patterns distinct from those shown in FIGS. 5A-5C (e.g., the valves may not be axially or linearly actuated). In another embodiment, actuators may be mounted in a variety of locations or alignments, including (but not limited to) coaxial with or offset from the primary axis of motion for the valve, parallel or at an angle, or on the same face or a different face.

FIG. 5A illustrates an aspect of a fluid interface mating sequence 500, according to one example. In one or more embodiments, the pairing mating sequence 500 or associated process can begin when two host structures initiate a rendezvous routine. As shown in FIG. 5A, the host structures 402A and 402B are in unmated states. In the unmated or disconnected state, both host structures 402A and 402B, along with their respective fluid interfaces 410A and 410B, are separated and not engaged. The host structures 402A and 402B can be positioned on their respective equipment modules (e.g., spacecraft or satellite), although the equipment modules are not shown in the present embodiment. The host structures 402A and 402B are not yet aligned or connected to each other. Each host structure 402A and 402B can maintain structural integrity independently. In the disconnected state, no fluid is being transferred between the fluid interfaces 410A and 410B.

The host structures 402A and 402B can each be equipped with a controller that can manage the operation of each respective modular connector 402. The controller can include a computing device, such as a computer, a microcontroller, a FPGA, or the like. The controller can initiate a rendezvous routine based on pre-programmed instructions or commands. The controller can manage the operation of the host structures 402 and the fluid interfaces 410. In some embodiments, each fluid interface of the fluid interfaces 410 can each be equipped with a microcontroller that can manage their respective operations. In other examples, a microcontroller can manage one or more fluid interfaces. The microcontroller can be integrated with a controller of the host structures 402. The rendezvous routine can be autonomous, such that a human in the loop is not required for operation. The host structures 402 and fluid interfaces 410 can make decisions based on situational awareness or perception to affect and control the operational state. In one example, an equipment module 404 can include a computing system operatively configured to control the fluid interface 410. According to various aspects of the present disclosure, the computing system and/or the microcontroller can initiate movement of the fluid interface 410 in response to detecting a particular fluid level, fluid temperature, orbital position of an equipment module 404, etc.

The valves 416A and 416B can be in a closed position to prevent any fluid leakage. Sealing mechanisms can be engaged to ensure no fluid escapes. The sealing mechanisms can include O-ring seals, gasket seals, lip seals, metal-to-metal seals, bellowed seals, spring-loaded seals, double block and bleed seals, or any other appropriate scaling mechanisms.

In the disconnected state, the actuators 412A and 412B can be in a standby mode. In standby mode, the actuators are ready to be activated for the connection process. The actuators 412 can be connected to their respective power sources but not actively consuming significant power. The mechanical linkages 414A and 414B can be in a neutral, or disengaged, position. In the neutral position, the mechanical linkages 414 are not exerting any force on the valves 416. The mechanical linkages 414 can be aligned with their respective host structures 402, ready to transmit force when activated.

The host structures 402 can include various sensors for monitoring fluid transfer aspects and characteristics such as temperature, flow rate, pressure, etc. In some embodiments, the fluid interfaces 410 can include various sensors for monitoring fluid transfer aspects and characteristics such as temperature, flow rate, pressure, etc., for modularity. The host structures 402 can be equipped with proximity sensors. Proximity sensors can be of different types, including inductive, capacitive, ultrasonic, and photoelectric sensors. Inductive proximity sensors can detect metallic objects by generating an electromagnetic field and measuring changes in the field caused by the presence of a conductive material. Capacitive proximity sensors can detect both metallic and non-metallic objects by measuring changes in capacitance when an object approaches the sensor. Ultrasonic proximity sensors can use sound waves to detect objects, while photoelectric sensors use light beams. These sensors can be strategically placed on the host structures 402 to provide comprehensive coverage and real-time data on the position and movement of the modular connectors and fluid interfaces. For example, inductive proximity sensors can be placed near the docking interface to ensure precise alignment of the host structures 402A and 402B during the docking process. The data from these sensors can be continuously monitored by a control system of the host structure (or equipment vehicle), allowing for real-time adjustments and ensuring a secure and accurate connection.

While in a disconnected state, the host structures 402 can perform one or more operations for preparing for the rendezvous process. For example, the host structures 402A and 402B may move towards each other to initiate the connection, docking, and rendezvous process. The host structures 402A and 402B can initiate the rendezvous process based on instructions from a control system (or from a computing device, microcontroller, etc.). The control system (or computing device, microcontroller, etc.) can be located within the host structures 402 or within another module such as equipment modules 404. The control system can include a main electronics circuit board to provide power and facilitate control of the host structures 402A and 402B. In certain embodiments, the main electronics circuit board can provide connection support for a variety of components, including but not limited to limit switches, proximity sensors, digital controllers, inertial measurement units, power connection sensors, and other suitable components. In some embodiments, the inertial measurement unit (IMU) can be a multi-axis IMU, such as, for example, a nine-axis IMU. In some embodiments, the main electronics circuit board manages data acquisition. In certain embodiments, the main electronics circuit board can communicate with interface boards described above. In one embodiment, the main electronics circuit board may include four protruding sections, whereby the center of the main electronics board has a substantially circular aperture, and the ends of each protruding section are shaped like a portion of a triangle. In another embodiment, the main electronics circuit board may be any suitable shape to perform the rendezvous process. The host structures 402A and 402B can use wireless communication to exchange data on current positions and orientations. Thrusters or propulsion systems on the equipment modules can adjust the positions and orientations of the host structures 402A and 402B. The sensors can continuously monitor the relative positions and orientations of the host structures 402A and 402B. The control systems can make real-time adjustments to the host structure trajectories as the host structures approach each other. As the host structures 402A and 402B approach each other, the proximity sensors can detect the decreasing distance. The control system can use IMUs to ensure the host structures 402A and 402B are properly aligned for docking.

FIG. 5B illustrates an aspect of a fluid interface mating sequence 500, according to one example. As shown in FIG. 5B, and in at least one example, the host structures 402A and 402B are in a connected or docked state. In response to the host structures docking, the fluid interfaces 410A and 410B may remain disconnected (at least initially, such as for a predetermined time of 1 s, 2 s, 5 s, etc.). The fluid interfaces 410A and 410B may remain disconnected indefinitely while the host structures 402A and 402B are docked. The fluid interfaces 410A and 410B may be connected and disconnected as needed, unrelated to the docking event. In one example, docking can include the secure mechanical connection of the host structures 402A and 402B, ensuring proper alignment and readiness for the subsequent fluid interface connection. The connection of the host structures 402A and 402B can be verified through complementary pins and sockets that can transmit electrical signals, ensuring proper mechanical contact. In one example, a loopback circuit can provide an electrical signal to the one or more fluid interface controllers confirming that the host structures 402 have completed a successful docking. The tight mechanical contact required for the pins and sockets to transmit an electrical signal may be interpreted as a sign of a successful mechanical mate between the host structures 402A and 402B. The verification can be logic/conditional (e.g., if voltage on pin is high or low). For example, the control system can check if the voltage on a specific pin is high or low. A high voltage can indicate that the pins and sockets are in tight mechanical contact, signifying a successful mate. Conversely, a low voltage can indicate an incomplete or faulty connection. This verification process can ensure that the host structures 402A and 402B are properly aligned and securely connected, providing the necessary load-bearing support for the subsequent connection of the fluid interfaces 410A and 410B. The continuous monitoring and real-time feedback from the electrical signals allow the control system to promptly detect and address any issues, ensuring a reliable and secure connection. The successful verification of the host structure connection ensures that the fluid interfaces can be safely engaged for fluid transfer.

The fluid interfaces 410A and 410B may start out in a disconnected position. Upon confirming the successful mating of the host structures 402A and 402B the control system can initiate the process to connect the fluid interfaces 410A and 410B. The actuators 412A and 412B can be activated by the fluid interface controller. The fluid interface controller can transmit one or more signals to the actuators 412A and 412B to initiate movement. The actuators 412A and 412B can provide the mechanical force needed to move the valves 416A and 416B towards each other. The fluid interface controller can continuously monitor the position and alignment of the valves 416A and 416B. The mechanical linkages 414A and 414B can transmit the force for the respective actuators 412A and 412B to the respective valves 416A and 416B. As the actuators 412A and 412B move their respective actuator rods 422A and 422B, the mechanical linkages 414A and 414B coupled to the actuator rods 422A and 422B can move the valves 416A and 416B towards each other. The mechanical linkages 414A and 414B can provide the proper alignment for the valves 416A and 416B to connect. The valves 416A and 416B may be transitioning from a closed position to an open position as the valves begin to connect. The sealing mechanisms, such as O-rings or gaskets, can remain engaged to maintain a tight seal until the connection is complete.

FIG. 5C illustrates an aspect of a fluid interface mating sequence 500, according to one example. In particular, FIG. 5C illustrates the fluid interfaces 410A and 410B in a connected or mated state. The successful mating can enable the transfer of fluids between the equipment modules of the fluid interfaces 410A and 410B. This state may be characterized by the secure and sealed connection of the valves 416A and 416B, enabling the controlled flow of fluids.

The actuators 412A and 412B can fully extended to maintain the connection of the valves 416A and 416B. The actuators 412A and 412B can enter a standby mode, where the actuators 412A and 412B are generally inactive (or exerting a constant force) but ready to adjust the valve positions if necessary. The actuators 412A and 412B can remain in standby mode until a command to disconnect the fluid interfaces 410A and 410B is received.

The mechanical linkages 414A and 414B can remain in a fixed position. The mechanical linkages 414A and 414B can provide a force for maintaining the connection between the valves 416A and 416B and to ensure that the valves 416A and 416B remain aligned during the transfer of fluids. The mechanical linkages 414A and 414B can provide the respective valves 416A and 416B during fluid transfer.

The fluid interfaces 410 can handle the flow of a variety of fluids. Common fluids utilized by spacecraft may include pressurant like helium (He) and nitrogen (N2); propellants like hydrogen (H2), hydrazine (N2H4), hydrogen peroxide (H2O2), oxygen (O2), dinitrogen tetroxide (N204), and Xenon (Xe); and other utility fluids that could be purposed for multiple mission needs like water (H2O) and air. Cryogenic fluids, such as liquid hydrogen (LH2), liquid oxygen (LOX), liquid nitrogen (LN2), liquid helium (LHe), or hydrocarbons such as those present in liquified natural gas (LNG) can also be transferred between the fluid interfaces 410.

Figure 6A:
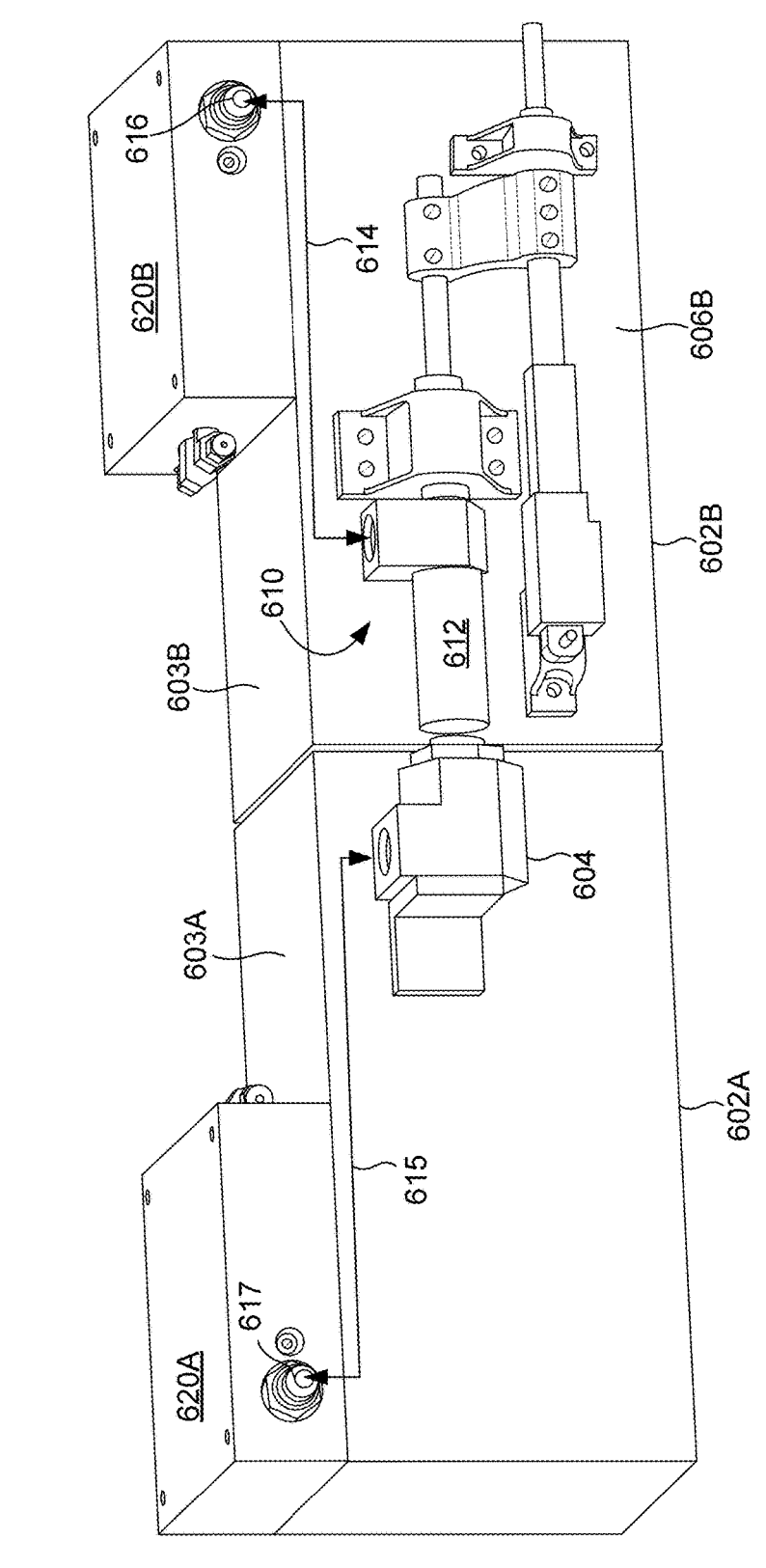
FIGS. 6A-6B illustrate an exemplary modular fluid interface with a manifold housing according to one embodiment of the present disclosure.

Referring now to FIG. 6A, illustrated is an exemplary docked host structure pair 600. In particular, FIG. 6A shows a host structure 602A and a host structure 602B docked to form the pair 600, where the host structure 602A includes a manifold housing 620A on an upper exterior surface 603A, and the host structure 602B includes a fluid interface 610 with a manifold housing 620B mounted onto an upper exterior surface 603B. In one example, the host structure 602B can include the fluid interface 610 mounted onto an exterior surface 606B. In one example, the host structure 602A can include a target valve 604. According to various aspects of the present disclosure, the fluid interface 610 can be operatively configured to extend a valve 612 (such as a quick release valve) towards the target valve 604 to mate and form a secure connection between the target valve 604 and the valve 612.

Figure 6B:
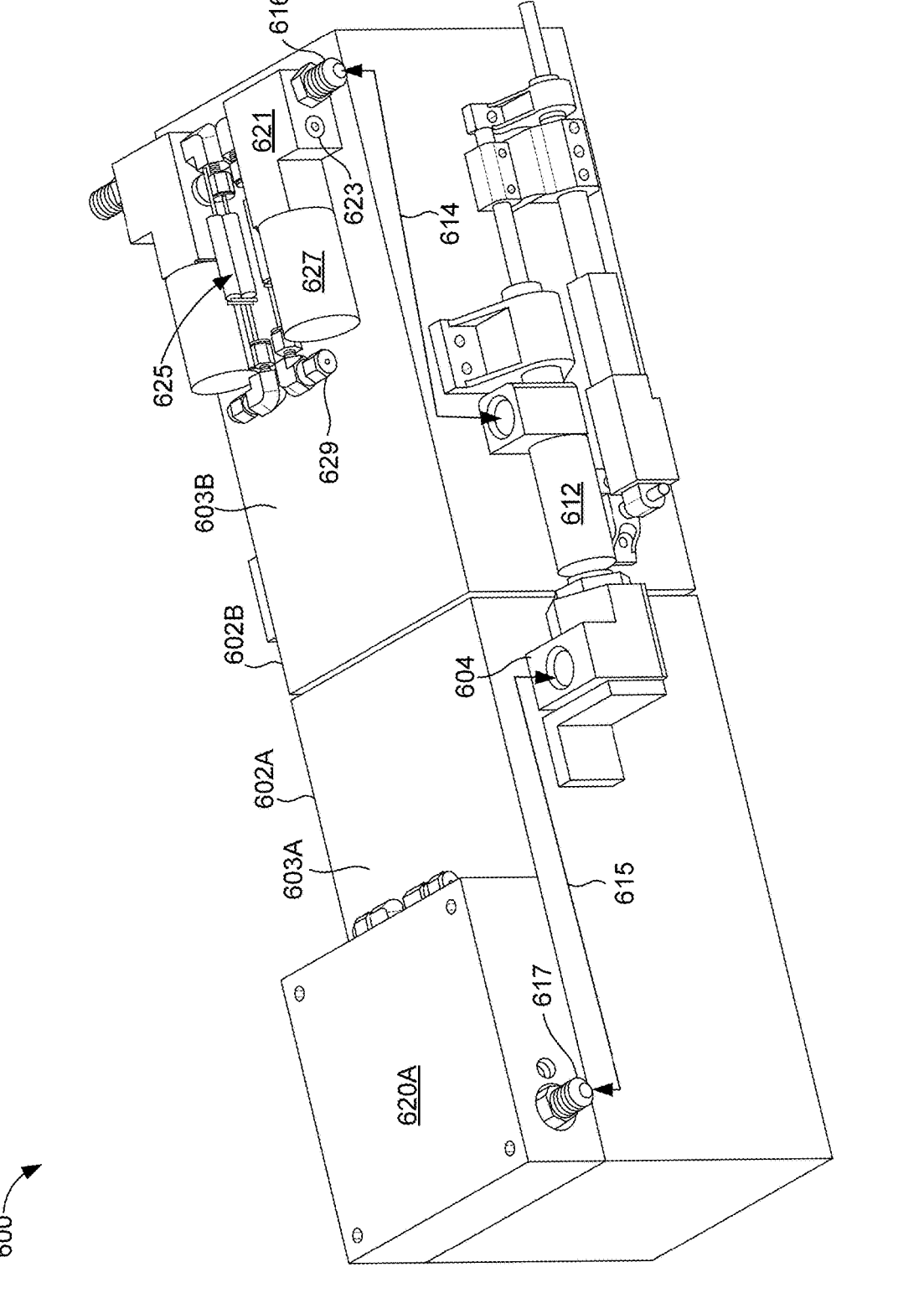

In one example, the manifold housing 620A and the manifold housing 620B (collectively referred to herein as the manifold housings 620 or manifold backpacks 620) can house one or more fluid manifolds that can be configured to channel fluids from one or more sources to one or more destinations, such as between fluid interfaces and equipment modules. The fluid manifold (as shown in FIG. 6B) can control the flow of fluids or gases to the fluid interface 610 and facilitate the transfer of fluids between equipment modules. In one example, the components within the manifold housings can act as a fluid controller within the overall fluid interface system, such that the components within the manifold housings regulate the transfer and transport of fluid through the fluid interfaces. The manifold backpacks 620 can be constructed of stainless steel and machined for a smooth interior surface. The manifold backpacks 620 can be passivated to maintain high material compatibility with several fluids, including fluids for typically used in aerospace system. The manifold backpacks 620A and 620B can each house multiple manifolds within their respective housings, such as less than ½U CubeSat (10 cm×10 cm×5 cm) in a modular system. In one example, multiple fluid manifolds can allow for the simultaneous transfer of different types of fluids, such as pressurants, propellants, and utility fluids, without cross-contamination. The modularity of the fluid manifolds can enable easy scalability and customization, allowing the system to be tailored to specific mission requirements or operational needs. Each fluid manifold can be independently controlled and monitored, providing redundancy and increasing the overall reliability of the system. In the event of a failure in one manifold, the others can continue to operate, ensuring uninterrupted fluid transfer. The use of multiple manifolds can distribute the load more evenly, reducing the mechanical stress on individual components and extending their lifespan. For example, in a spacecraft refueling operation, multiple modular manifolds housed in the manifold backpacks 620 can facilitate the efficient transfer of liquid hydrogen (LH2) and liquid oxygen (LOX) simultaneously, optimizing the refueling process and enhancing mission efficiency.

In one example, the fluid interface 610 can include an interconnect component 614, or a tubing 614, for connecting components of the manifold housing 620B to the valve 612 to allow for fluid transport through the same. In particular, the tubing can be an elastically deforming tubing manufactured from a ductile metal (such as stainless steel). The tubing 614 can be fully sealed component. The tubing 614 can be operatively connected to a fluid port 616 of a manifold housed within the manifold housing 620B. The fluid port 616 can be a fluid outlet port. The tubing 614 can ensure that fluid can be transferred efficiently and reliably, even when there is relative movement between the connected parts (such as between the valve 612 and the manifold fluid port 616. The tubing 614 can be flexible enough to accommodate axial movement and misalignment between components of the fluid interface 610 and the target valve 604. The flexibility can aid in maintaining a sealed connection during movement of the valves. The interconnect component can provide a leak-free seal to preventing fluids and gases from escaping during transfer. The leak-free seal can be achieved through the use of materials and designs that can withstand high pressures and maintain their integrity under various operating conditions. The tubing 614 can provide extension with minimal restoring force. The tubing 614 can be resistant to corrosion. For example, the tubing 614 can include a stainless steel tubing with bellows and/or corrugation. The bellows can allow for axial elongation with a low force. In one example, the tubing 614 can include coiled hard lines. The coiled hard lines can be made from stainless steel or other metals. The coiled hard line can act as spring to enable extension and contraction while maintaining structural integrity. The coiled hard lines can reduce damage due to vibrations. In another example, the tubing 614 can include serpentine hard lines. The serpentine hardlines can be a flexible, snake-like shape that can bend and flex around other fluid interface 610 components. The serpentine design can accommodate movement and misalignment. In another example, the tubing 614 can be a flex hose. The flex hose can be made out of corrugated stainless steel or PTFE (Polytetrafluoroethylene) tubes with steel braided exteriors. The flex hose can accommodate the movement of the fluid interface 610 without requiring additional actuation force. The tubing 614 can be a compliant mechanism that enables motion from inherent characteristics. In one example, a tubing 615 similar to the tubing 614, and the tubing 615 can be operatively connected to the valve 604 and a manifold port 617 at the manifold 620A. The tubing 615 can include rigid components with sliding seals such as, linear joints or pistons, telescoping tubes, and rotating joints.

Referring to FIG. 6B, illustrated is the exemplary docked host structure pair 600 with the manifold housing 620B cover removed. As mentioned above in connection with the discussion of FIG. 6A, the manifold housings 620 can include components such as one or more fluid manifolds 621, relief valves 623, solenoid valves 625, fluid sensors 627, and customer interface ports 629, and a manifold fluid port 616.

The fluid manifold 621 can facilitate the transfer of fluids between equipment modules, fluid interfaces, and host structures. The fluid manifold 621 can be made from stainless steel (or other appropriate materials) and can be machined for a smooth interior surface. In one example, the fluid manifold 621 can be additively manufactured. The stainless steel can be passivated to maintain high material compatibility with several fluids, including aerospace fluids. The fluid manifold 621 can have a small form factor design that minimizes size, weight, and power (SWaP) requirements.

The fluid manifold 621 can draw power from the host structure or the equipment module. The compact design of the fluid manifold 621 can allow multiple manifolds to fit within the manifold housing 620, where the compact design is less than ½U in a modular system. The fluid manifold 621 can monitor and regulate the pressure within system. The fluid manifold 621 can include one or more fluid sensors 627 to monitor fluid flow characteristics within the system. The sensors 627 can include a pressure transducer or sensor, temperature sensor, flowmeter, and other appropriate sensors. The pressure sensors can include a gauge pressure sensor, an absolute pressure sensor, a differential pressure sensor, or any other suitable pressure sensor. The sensors can be located in various locations of the fluid manifold 621. The sensors can be located upstream of the fluid interface 610 to monitor the pressure before the fluid enters the valves, ensuring that the pressure is within safe limits for the connection. The sensors can be located near pressure relief valves 623 to ensure that any excess pressure can be safely vented. The pressure sensor can trigger the relief valve 623 if the pressure exceeds a predetermined limit. The sensors 627 can be located in interstitial cavities to monitor the pressure in cavities that may be isolated from other parts of the system by valves or other means. The pressure sensors 627 can measure the pressure difference across a valve, ensuring that the valve is functioning correctly.

The pressure relief valve 623 can safely vent the system in case of an overpressure event. The relief valve 623 can be made from materials such as stainless steel or brass, which can provide durability and resistance to corrosion. The relief valve 623 can operate by automatically opening when the pressure within the manifold 621 exceeds a predetermined threshold. The relief valve 623 can allow excess fluid to escape and thereby preventing potential damage to the system and fluid interface 610. For example, during a spacecraft fluid transfer, the relief valve 623 can ensure that the pressure of liquid oxygen (LOX) remains within predetermined limits, venting any excess pressure to avoid overpressure events.

The solenoid valve 625 can be an electrically operated valve used to control the flow of fluid within the fluid manifold 621. The solenoid valve 625 can include a coil of wire (the solenoid) and a moveable plunger that opens or closes the valve when an electric current is applied. The solenoid valve 625 can be made from stainless steel, brass, reinforced polymers, or any other material that can provide strength and resistance to various fluids. The solenoid valve 625 can regulate the flow of fluids within the fluid manifold 621 by opening or closing in response to a command from the control system (or computing device). For example, in a spacecraft's fuel transfer system, the solenoid valve 625 can be used to precisely control the flow of hydrazine (N2H4) to the propulsion module, ensuring accurate and reliable fluid transfer.

The sensor 627, such as one or more pressure transducers, can monitor the pressure within the fluid manifold 621. The sensor 627 can be a sensor that converts the physical pressure of the fluid within the manifold 621 into an electrical signal to be processed by the computing device. The sensor 627 can be made from stainless steel and can incorporate ceramic sensor technology for high accuracy and durability. The sensor 627 can continuously monitor the pressure within the fluid manifold 621 and provide real-time data to the control system. The data can be used for regulating the pressure and ensuring the safe operation of the fluid interface 610.

The customer interface port 629 can be a connection point between the fluid manifold 621 and one or more fluid sources with the host structure 602B and/or any modules connected thereto. The customer interface 629 can facilitate the transfer of fluids between the two components. A tubing can be operatively connected to the customer interface 629 to provide a flexible and sealed connection, accommodating movement and misalignment while maintaining a leak-free environment. The customer interface 629 can be made from materials such as stainless steel, PTFE (Polytetrafluoroeth-ylene), or other high-performance polymers that offer chemical resistance and durability. For example, the customer interface 629 can transfer fluids such as liquid hydrogen (LH2) efficiently and safely from the fluid manifold 621 to the fluid interface 610. The customer interface 629 can integrate with various types of interconnect components and tubes, such as bellowed tubes, coiled or spring-shaped tubes, flex hoses, etc., to ensure reliable fluid transfer in dynamic environments.

In some embodiments, additional fluid ports may be included for operations such as purging, cleaning, bleeding, venting, filling, or draining the fluid interface 610 or the equipment vehicle's fluid system. The ports can be designed for temporary or permanent connection. In some embodiments, additional fluid control techniques or devices may be utilized, before or after the valves of the fluid interface 610 are mated, in order to measure and control the fluid and flow characteristics to meet desired performance. In some embodiments, the fluid interface 610 can measure and control the fluid and flow characteristics using orifices, restrictors, Joule-Thompson devices, regulators, valves (all types), pressure sensors, temperature sensors, heat exchangers, volumetric or mass flow meters, actuators, pressure relief systems such as burst disks or valves, seals, fittings, manifolds, switches, compressors, filters, diffusers, surge tanks, pumps, piping, and tubing.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hard-wired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc., that perform particular tasks or implement particular defined data types, within the computer. Computer-executable instructions, associated data structures and/or schemas, and program modules represent examples of the program code for executing the steps disclosed herein. The particular sequence of such executable instructions or associated data structures represents examples of corresponding acts for implementing the functions described in such steps.

Those skilled in the art will also appreciate that the claimed and/or described systems may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A fluid transport interface, comprising:
a fluid controller mounted onto a host structure, the fluid controller comprising a manifold, the manifold comprising a fluid outlet port and a fluid inlet port, and wherein the fluid controller further comprises one or more fluid sensors operatively configured to measure flow characteristics of one or more fluids transferred between the fluid inlet port and the fluid outlet port, wherein the fluid inlet port is coupled to at least one fluid source; and
a fluid connector mounted onto the host structure, the fluid connector comprising an actuator mounted onto the host structure, a valve coupled to an actuator rod of the actuator, and a tubing comprising a first end and a second end, wherein the first end is operatively connected to the valve and the second end is operatively connected to the fluid outlet port.

2. The fluid transport interface of claim 1, further comprising a computing device housed within the host structure, wherein the computing device is operatively configured to detect a docking between the host structure and a target host structure.

3. The fluid interface of claim 2, wherein in response to detecting the docking between the host structure and the target host structure, the computing device is further operatively configured to initiate an autonomous transfer of a fluid between the fluid transport interface and a target fluid transport interface at the target host structure.

4. The fluid transport interface of claim 1, wherein the fluid transport interface is operatively configured to connect the valve to a target valve at a target fluid transport interface in response to the host structure docking to a target host structure.

5. The fluid interface of claim 1, wherein the fluid controller further comprises a solenoid valve operatively configured to control fluid flow from the at least one fluid source through the fluid inlet port.

6. The fluid transport interface of claim 1, wherein the tubing is manufactured from a ductile metal, and wherein the tubing is temporarily elongated in response to the fluid transport interface connecting the valve to the target valve.

7. The fluid transport interface of claim 1, wherein the one or more fluid sensors comprise a fluid pressure transducer, a temperature sensor, and/or a flowmeter.

8. The fluid transport interface of claim 1, wherein the manifold further comprises a pressure relief valve operatively configured to relieve a fluid pressure within the manifold in response to the fluid pressure exceeding a predetermined threshold.

9. A system, comprising:
a target valve at a target host structure; and
a fluid transport interface at a source host structure, wherein the fluid transport interface comprises:
a fluid controller mounted onto the source host structure, the fluid controller comprising a manifold, the manifold comprising a fluid outlet port and a fluid inlet port, wherein the fluid controller further comprises one or more fluid sensors operatively configured to measure flow characteristics of one or more fluids transferred between the fluid inlet port and the fluid outlet port, and wherein the fluid inlet port is coupled to at least one fluid source;
a plurality of fluid connectors, wherein each fluid connector of the plurality of fluid connectors is mounted onto the source host structure, wherein each fluid connector of the plurality of fluid connectors comprises an actuator, a valve coupled to an actuator rod of the actuator, and a tubing comprising a first end and a second end, wherein the first end is operatively connected to the valve and the second end is operatively connected to the fluid outlet port; and a computing device housed within the source host structure, wherein the computing device is operatively configured to:

detect a docking between the source host structure and the target host structure;

determine a docking orientation between the source host structure and the target host structure;

based on the docking orientation, initiate movement of a particular valve towards the target valve, wherein the particular valve corresponds to a particular fluid connector of the plurality of fluid connectors, and wherein initiating movement of the particular valve comprises moving a particular actuator rod via activating the actuator;

connect the particular valve to the target valve with a predetermined force, via continued activation of the actuator, wherein the predetermined force is based on a maximum expected operating pressure; and initiate a transfer of a fluid from the at least one fluid source to the target valve through the particular fluid connector.

10. The system of claim 9, wherein the fluid controller further comprises a solenoid valve operatively configured to control fluid flow from the at least one fluid source through the fluid inlet port.

11. The system of claim 9, wherein the tubing is manufactured from a ductile metal, and wherein the tubing is temporarily elongated in response to the fluid transport interface connecting the valve to the target valve.

12. The system of claim 9, wherein the one or more fluid sensors comprise a fluid pressure transducer, a temperature sensor, and/or a flowmeter.

13. The system of claim 9, wherein the manifold further comprises a pressure relief valve operatively configured to relieve a fluid pressure within the manifold in response to the fluid pressure exceeding a predetermined threshold.

* * * * *